United States Patent
Kawatsu et al.

[19]

[11] Patent Number: 6,120,925
[45] Date of Patent: Sep. 19, 2000

[54] APPARATUS FOR AND METHOD OF REDUCING CONCENTRATION OF CARBON MONOXIDE AND FUEL-CELLS GENERATOR SYSTEM WITH SUCH APPARATUS

[75] Inventors: Shigeyuki Kawatsu, Susono; Masayoshi Taki, Kounan, both of Japan

[73] Assignee: Toyota Jidosha Kabushiki Kaisha, Toyota, Japan

[21] Appl. No.: 08/935,062

[22] Filed: Sep. 22, 1997

[30] Foreign Application Priority Data

Sep. 27, 1996 [JP] Japan .................................. 8-277444

[51] Int. Cl.[7] .................................................. H01M 8/04
[52] U.S. Cl. ........................ 429/40; 429/26; 429/17; 429/19; 429/34; 422/196; 48/127.7
[58] Field of Search ...................... 422/171–77, 196; 429/17, 19, 34, 26; 48/127.7

[56] References Cited

U.S. PATENT DOCUMENTS

| | | | |
|---|---|---|---|
| 4,554,223 | 11/1985 | Yokoyama | 429/20 |
| 5,271,916 | 12/1993 | Vanderborgh | 423/246 |
| 5,432,021 | 7/1995 | Wilkinson et al. | 429/17 |
| 5,658,681 | 8/1997 | Sato | 429/13 |
| 5,843,195 | 12/1998 | Aoyama | 48/127.7 |
| 5,874,051 | 2/1999 | Heil et al. | 422/171 |

FOREIGN PATENT DOCUMENTS

| | | |
|---|---|---|
| 5-201702 | 8/1993 | Japan . |
| 7-185303 | 7/1995 | Japan . |
| 7-196302 | 8/1995 | Japan . |

*Primary Examiner*—Maria Nuzzolillo
*Assistant Examiner*—Mark Ruthkosky
*Attorney, Agent, or Firm*—Oblon, Spivak, McClelland, Maier & Neustadt, P.C.

[57] ABSTRACT

The structure of the present invention enables all catalysts packed in a cooling layer to be kept in an active temperature range, thereby sufficiently reducing the concentration of carbon monoxide included in a hydrogen-rich gas. A supply of water is fed through a water inlet pipe 40 to a selective CO oxidizing unit 34 of a reformer 30. The heat of vaporization of the supplied water directly cools down selective CO oxidizing catalysts 50 stored in the selective CO oxidizing unit 34. This enhances the cooling efficiency and enables all the selective CO oxidizing catalysts 50 stored in the selective CO oxidizing unit 34 to be maintained in the active temperature range, thus sufficiently reducing the concentration of carbon monoxide included in a resulting gaseous fuel.

10 Claims, 27 Drawing Sheets

APPARATUS FOR AND METHOD OF REDUCING CONCENTRATION OF CARBON MONOXIDE AND FUEL-CELLS GENERATOR SYSTEM WITH SUCH APPARATUS

BACKGROUND OF THE INVENTION

1. Field of the Invention

The present invention relates to an apparatus for and a method of reducing the concentration of carbon monoxide and a fuel-cells generator system with such an apparatus. More specifically the present invention pertains to an apparatus for reducing the concentration of carbon monoxide included in a hydrogen-rich gas, which contains hydrogen and carbon monoxide and has a concentration of carbon monoxide lower than a concentration of hydrogen, and also to a method of the same. The present invention further pertains to a fuel-cells generator system with such an apparatus for reducing the concentration of carbon monoxide.

2. Description of the Related Art

In a fuel-cells generator system, supplies of hydrogen and oxygen are respectively fed to a fuel electrode and an oxidation electrode arranged across an electrolyte, and an electromotive force is generated through an electrochemical reaction on the electrodes. It is desirable to supply a hydrogen-rich gas to the fuel electrode, in order to enhance the power generation efficiency and prevents the air pollution.

A reformer is thus arranged before the fuel cells. The reformer reforms a crude gaseous fuel, which includes a hydrocarbon, such as methanol, or an alcohol as the primary component, to a hydrogen-rich gas in the presence of a reforming catalyst. Even in the reformer of enhanced ability, however, contamination of the reformed gas with a small amount of carbon monoxide is inevitable. Existence of carbon monoxide in the reformed gas fed to the fuel electrode poisons platinum (Pt) carried as a catalyst on the fuel electrode, thereby lowering or unstabilizing the performance of power generation.

A technique proposed for preventing such a phenomenon selectively oxidizes carbon monoxide included in the reformed gas in the presence of a catalyst, thus reducing the concentration of carbon monoxide included in the gaseous fuel fed to the fuel electrode.

As disclosed in JAPANESE PATENT LAYING-OPEN GAZETTE No. 7-185303, another proposed technique uses a cooling layer arranged in a catalyst layer with the catalyst packed therein, thereby preventing the temperature of the catalyst from exceeding an active temperature range. This technique enables the catalyst to be kept in the active temperature range and accordingly reduces the concentration of carbon monoxide to a level that does not poison the catalyst on the electrodes in the fuel cells.

In the proposed technique, a coolant flowing through the cooling layer is a liquid mixture of water and methanol, which is the reforming material. This may cause part of the coolant to be vaporized in the cooling layer. Vaporization of the coolant raises the pressure in the cooling layer and prevents the coolant from flowing at a constant flow rate. The pulsative flow of the coolant causes non-uniformity of temperature in the cooling layer and thus prevents the whole catalyst layer from being cooled homogeneously. As a result, all the catalysts packed in the catalyst layer can not be kept within the active temperature range.

SUMMARY OF THE INVENTION

One object of the present invention is thus to enable all catalysts packed in a cooling layer to be kept within an active temperature range, thereby sufficiently reducing the concentration of carbon monoxide included in a hydrogen-rich gas.

Another object of the present invention is to reduce the concentration of carbon monoxide included in a gaseous fuel fed to a fuel electrode, thereby enhancing the efficiency of power generation of a fuel-cells generator system.

At least part of the above and the other related objects is realized by an apparatus for reducing concentration of carbon monoxide included in a hydrogen-rich gas, which contains both hydrogen and carbon monoxide. The apparatus includes: oxidizing gas introducing means for introducing an oxygen-containing oxidizing gas to the hydrogen-rich gas; an oxidizing unit having a catalyst that enables oxygen included in the introduced oxidizing gas to be bonded to the carbon monoxide included in the hydrogen-rich gas preferentially over hydrogen included in the hydrogen-rich gas; and water supply means for feeding a supply of water into the oxidizing unit.

In the carbon monoxide concentration reduction apparatus of the present invention (hereinafter referred to as the apparatus of the fundamental structure), the oxidizing gas introducing means introduces the oxidizing gas to the hydrogen-rich gas containing carbon monoxide. The catalyst in the oxidizing unit enables oxygen included in the introduced oxidizing gas to be bonded to the carbon monoxide included in the hydrogen-rich gas preferentially over hydrogen. The water supply means feeds a supply of water into the oxidizing unit. The oxidative reaction in the oxidizing unit is exothermic and thereby vaporizes water fed from the water supply means in the oxidizing unit. This structure allows the catalyst in the oxidizing unit to be directly cooled down by the heat of vaporization.

The apparatus of the fundamental structure directly cools down the catalyst in the oxidizing unit. This structure enhances the cooling efficiency and enables all the catalyst in the oxidizing unit to be kept within an active temperature range, thereby sufficiently reducing the concentration of carbon monoxide included in the hydrogen-rich gas.

In the apparatus of the fundamental structure, the water supply means may have a plurality of water supply conduits that enable water to be fed to the oxidizing unit via different pathways. This structure increases the area of the catalyst that receives a supply of water, thus homogeneously cooling down the whole oxidizing unit and preventing non-uniformity of temperature. This enables all the catalyst in the oxidizing unit to be more readily kept within the active temperature range.

In the structure with the plurality of water supply conduits, the catalyst in the oxidizing unit may be divided into a plurality of groups of catalyst having a predetermined shape. In this structure, the plurality of groups of catalyst are arranged along a flow direction of the hydrogen-rich gas, and the plurality of water supply conduits are arranged to enable water to be fed to the plurality of groups of catalyst. This structure increases the area of the catalyst that receives a supply of water by the number of water supply conduits, thus more effectively preventing non-uniformity of temperature.

In accordance with one preferable application, the apparatus of the fundamental structure further includes: temperature detection means for measuring a temperature of the oxidizing unit; and control means for regulating an amount of water supply by the water supply means, thereby enabling the temperature of the oxidizing unit to be kept within a predetermined range.

This preferable structure regulates the amount of water supply by the water supply means and thereby controls the temperature of the oxidizing unit measured by the temperature detection means within the predetermined range. This structure enables the oxidizing unit to be kept within a desired temperature range, that is, the active temperature range of the catalyst in the oxidizing unit, thereby effectively reducing the concentration of carbon monoxide included in the hydrogen-rich gas.

In accordance with another preferable application, the apparatus of the fundamental structure further includes: carbon monoxide concentration detection means for measuring a concentration of carbon monoxide included in the hydrogen-rich gas; oxidizing gas supply control means for regulating an amount of oxidizing gas supply by the oxidizing gas introducing means according to the concentration of carbon monoxide; and water supply control means for regulating an amount of water supply by the water supply means according to the amount of oxidizing gas supply.

In this preferable structure, in response to an increase in concentration of carbon monoxide in the hydrogen-rich gas, the oxidizing gas supply control means increases the amount of oxidizing gas supply and enhances the progress of the oxidative reaction, thereby reducing the concentration of carbon monoxide included in the hydrogen-rich gas. The enhanced progress of the oxidative reaction increases the heat generated by the oxidative reaction. The water supply control means regulates the amount of water supply according to the amount of oxidizing gas supply. This enables the degree of cooling the oxidizing unit to be specified according to the amount of heat generated by the oxidative reaction. This structure also enables the oxidizing unit to be kept within a desired temperature range, thereby effectively reducing the concentration of carbon monoxide included in the hydrogen-rich gas.

In the apparatus of the above structure, it is favorable that the water supply control means includes: water supply calculation means for specifying the amount of water supply by the water supply means in order to hold a predetermined ratio to the amount of oxidizing gas supply.

This structure allows the supply of water specified by the water supply calculation means and thus realizes a constant ratio of the amount of oxidizing gas supply by the oxidizing gas introducing means to the amount of water supply by the water supply means. This structure accordingly determines the degree of cooling the oxidizing unit in proportion to the amount of heat generated by the oxidative reaction.

In accordance with still another preferable application, the apparatus of the fundamental structure further includes: oxidative reaction detection means for detecting a progress of an oxidative reaction in the oxidizing unit; and control means for regulating an amount of water supply by the water supply means according to the progress of the oxidative reaction.

In this preferable structure, the oxidative reaction detection means detects the progress of the oxidative reaction in the oxidizing unit, and the control means regulates the amount of water supply by the water supply means according to the progress of the oxidative reaction. The oxidative reaction in the oxidizing unit is exothermic, so that the enhanced progress of the oxidative reaction increases the temperature of the oxidizing unit. Variation in amount of water supply by the water supply means changes the degree of cooling the oxidizing unit. Regulation of the amount of water supply according to the progress of the oxidative reaction thereby enables the degree of cooling the oxidizing unit to be controlled according to the progress of the oxidative reaction.

The apparatus of this structure enables the oxidizing unit to be kept within a desired temperature range, that is, the active temperature range of the catalyst in the oxidizing unit, thereby effectively reducing the concentration of carbon monoxide included in the hydrogen-rich gas.

In the above structure, the oxidative reaction detection means may include means for measuring a temperature of the oxidizing unit, wherein the oxidative reaction detection means detects said progress of the oxidative reaction based on the temperature of the oxidizing unit. Since the oxidative reaction in the oxidizing unit is exothermic, the observed temperature of the oxidizing unit shows the progress of the oxidative reaction. Regulation of the amount of water supply according to the observed temperature of the oxidizing unit thus enables the temperature control of the oxidizing unit according to the progress of the oxidative reaction.

In the above structure, the oxidative reaction detection means may include means for measuring a flow rate of the hydrogen-rich gas, wherein the oxidative reaction detection means detects the progress of the oxidative reaction based on the flow rate of the hydrogen-rich gas.

The progress of the oxidative reaction in the oxidizing unit is significantly affected by the amount of carbon monoxide included in the hydrogen-rich gas fed to the oxidizing unit. Since the amount of carbon monoxide is varied in proportion to the total amount of the hydrogen-rich gas, the flow rate of the hydrogen-rich gas shows the progress of the oxidative reaction. Regulation of the amount of water supply according to the observed flow rate of the hydrogen-rich gas thus enables the temperature control of the oxidizing unit according to the progress of the oxidative reaction.

In the above structure, the oxidative reaction detection means may include means for measuring a concentration of carbon monoxide included in the hydrogen-rich gas, wherein the oxidative reaction detection means detects the progress of the oxidative reaction based on the concentration of carbon monoxide. The progress of the oxidative reaction in the oxidizing unit is affected by the concentration of carbon monoxide included in the hydrogen-rich gas fed to the oxidizing unit. Regulation of the amount of water supply according to the observed concentration of carbon monoxide in the hydrogen-rich gas thus enables the temperature control of the oxidizing unit according to the progress of the oxidative reaction.

The present invention is also directed to a fuel-cells generator system, which includes: a reformer unit for converting a crude fuel including a hydrocarbon as a primary component to a hydrogen-containing reformed gas; oxidizing gas introducing means for introducing an oxygen-containing oxidizing gas to the reformed gas; an oxidizing unit having a catalyst that enables oxygen included in the oxidizing gas to be bonded to carbon monoxide included in the reformed gas preferentially over hydrogen included in the reformed gas; water supply means for feeding a supply of water into the oxidizing unit; and a fuel cell for receiving a supply of the reformed gas output from the oxidizing unit and generating an electromotive force through an electrochemical reaction of the reformed gas. This system is hereinafter referred to as the fuel-cells generator system of the fundamental structure.

The reformer unit reforms a crude fuel including a hydrocarbon as the primary component to a hydrogen-containing reformed gas. The oxidizing gas introducing means introduces the oxidizing gas to the reformed gas, and the catalyst in the oxidizing unit enables oxygen included in the oxidizing gas to be bonded to carbon monoxide included in the reformed gas preferentially over hydrogen. The water supply means feeds a supply of water into the oxidizing unit. This structure exerts the same effects as those of the apparatus of the fundamental structure discussed above and reduces the concentration of carbon monoxide included in the reformed gas. The fuel cell receives a supply of the reformed gas with the reduced concentration of carbon monoxide and generates an electromotive force through an electrochemical reaction of the reformed gas.

This structure significantly decreases the concentration of carbon monoxide included in the reformed gas and effectively reduces the degree of poisoning of a catalyst in the fuel cell with carbon monoxide. The fuel cell is accordingly free from the lowered output due to the carbon monoxide poisoning and is stably operated at high outputs.

In accordance with one preferable application, the fuel-cells generator system of the fundamental structure further includes: water content detection means for detecting a water content of an electrolyte membrane in the fuel cell; and control means for regulating an amount of water supply by the water supply means according to the water content of said electrolyte membrane.

In the fuel cell, the operating condition affects the water content of the electrolyte membrane. When the electrolyte membrane is too dried or too wet, the output of the fuel cell is undesirably lowered. In this preferable structure, the water content detection means detects the water content of the electrolyte membrane, and the control means regulates the amount of water supply according to the observed water content. This structure enables the amount of water vapor in the reformed gas fed to the fuel cell to be regulated according to the water content of the electrolyte membrane.

The preferable structure maintains the water content of the electrolyte membrane in the fuel cell within a predetermined range and prevents the fuel cell from being too dried or too wet, thus ensuring stable high outputs of the fuel cell.

In the fuel-cells generator system of the above structure, the water content detection means may include means for measuring an electrical resistance between electrodes in the fuel cell, wherein said water content detection means detects said water content of said electrolyte membrane based on said electrical resistance.

This structure measures the electrical resistance between the electrodes in the fuel cell, in order to determine the water content of the electrolyte membrane in the fuel cell. The amount of water supply by the water supply means is then regulated according to the observed electrical resistance.

In accordance with another preferable application, the fuel-cells generator system of the fundamental structure further includes: saturated amount of water vapor calculation means for calculating a saturated amount of water vapor included in the reformed gas that is output from the reformer unit and flown into the fuel cell; and control means for regulating an amount of water supply by the water supply means according to the saturated amount of water vapor, in order to prevent a moisture of the reformed gas from being supersaturated in the fuel cell.

In this preferable structure, the control means regulates the amount of water supply according to the saturated amount of water vapor calculated by the saturated amount of water vapor calculation means, thus preventing the reformed gas from being flown into the fuel cell under a supersaturated condition. This structure effectively prevents the supersaturated water vapor in the reformed gas from aggregating to liquid water in the fuel cell and accordingly blocking flow paths in the fuel cell.

In accordance with still another preferable application, the fuel-cells generator system of the fundamental structure further includes: reformed gas pressure regulation means for regulating a pressure of the reformed gas fed to the fuel cell; saturated amount of water vapor calculation means for calculating a saturated amount of water vapor included in the reformed gas that is output from the reformer unit and flown into the fuel cell; and control means for controlling the reformed gas pressure regulation means according to the saturated amount of water vapor, in order to prevent a moisture of the reformed gas from being supersaturated in the fuel cell.

In this structure, the control means controls the reformed gas pressure regulation means according to the saturated amount of water vapor calculated by the saturated amount of water vapor calculation means, thus varying the pressure of the reformed gas and the saturated amount of water vapor of the reformed gas. This prevents the reformed gas from being flown into the fuel cell under a supersaturated condition. This structure effectively prevents the supersaturated water vapor in the reformed gas from aggregating to liquid water in the fuel cell and accordingly blocking flow paths in the fuel cell.

It is preferable that the fuel-cells generator system of the above structure further includes: oxidizing gas supply means for feeding an oxygen-containing oxidizing gas to an oxygen electrode included in the fuel cell; oxidizing gas pressure regulation means for regulating a pressure of the oxidizing gas; and control means for controlling the reformed gas pressure regulation means and the oxidizing gas pressure regulation means, in order to enable a pressure difference between the reformed gas and the oxidizing gas to be kept within a predetermined range.

In the fuel-cells generator system of this structure, the control means controls both the reformed gas pressure regulation means and the oxidizing gas pressure regulation means, in order to keep the pressure difference between the reformed gas and the oxidizing gas within a predetermined range.

The electrolyte membrane in the fuel cell has an extremely small thickness and may be damaged by the large pressure difference between the reformed gas and the oxidizing gas. This structure, however, enables the pressure difference between the reformed gas and the oxidizing gas to be kept within the predetermined range, thus protecting the electrolyte membrane from damages.

In accordance with another preferable application, the fuel-cells generator system of the fundamental structure further includes stop-time control means for actuating the water supply means to feed a supply of water to the oxidizing unit at the time of stopping operation of the oxidizing unit.

In this structure, the water supply means is actuated to feed a supply of water to the oxidizing unit. This structure quickly lowers the temperature of the oxidizing unit at the time of stopping operation of the oxidizing unit, thereby rapidly stopping evolution of the hydrogen-rich gas.

In this preferable structure, the stop-time control means may include: stop-time detection means for detecting a time of change from an operating state to a ceased state of the fuel cell; and control means for actuating the water supply means to feed a supply of water to the oxidizing unit at the time of change to the ceased state.

At the time of change from the operating state to the ceased state of the fuel cell, the water supply means is actuated to feed a supply of water to the oxidizing unit. This structure quickly lowers the temperature of the oxidizing unit at the time of change to the ceased state of the fuel cell, thereby rapidly stopping evolution of the hydrogen-rich gas.

In accordance with still another preferable application, the fuel-cells generator system of the fundamental structure further includes: water recovery means for condensing moisture evolved from the fuel cell through the electrochemical reaction and thereby recovering the moisture in the form of liquid water; and water utilization means for utilizing the water recovered by the water recovery means in the water supply means.

In the fuel cell, water vapor or water droplets are produced on the oxygen electrode during power generation. In the fuel-cells generator system of the above structure, the water recovery means condenses the moisture to liquid water, and the water utilization means utilizes the recovered water. This reduces the size of a water tank included in the water supply means and decreases the required amount of water stored in the water tank. Discharge of the remaining gas on the oxygen electrode to the atmosphere causes white fumes. This structure, however, prevents such a phenomenon.

In accordance with another preferable application, the water supply means may have water pressurizing means for pressurizing water and feeding said pressurized water to said oxidizing unit by utilizing a flow of gaseous exhaust from said fuel cell.

Pressurization of water is required, in order to feed water from the water supply means to the oxidizing unit. When electrical energy generated by the fuel cell is used as the power source of the pressurization, the energy efficiency of the whole fuel-cells generator system is undesirably lowered. This preferable structure, however, utilizes the flow of gaseous exhaust to pressurize water, thus enabling water to be fed to the oxidizing unit without lowering the energy efficiency of the whole fuel-cells generator system.

The present invention is further directed to a method of reducing concentration of carbon monoxide included in a hydrogen-rich gas, which contains both hydrogen and carbon monoxide. The method includes the steps of:

(a) introducing an oxygen-containing oxidizing gas to the hydrogen-rich gas;

(b) activating a catalyst to enable oxygen included in the oxidizing gas to be bonded to carbon monoxide included in the hydrogen-rich gas preferentially over hydrogen included in the hydrogen-rich gas; and (c) feeding a supply of water to the catalyst. This method is hereinafter referred to as the method of the fundamental structure.

In the method of the fundamental structure, the oxidizing gas is introduced into the hydrogen-rich gas containing carbon monoxide in the step (a). The catalyst enables oxygen included in the oxidizing gas to oxidize carbon monoxide included in the hydrogen-rich gas preferentially over hydrogen in the step (b). Water is supplied to the catalyst in the step (c). Since the oxidative reaction in the presence of the catalyst is exothermic, water fed in the step (c) is vaporized on or in the vicinity of the catalyst. This structure enables the catalyst to be directly cooled down by the heat of vaporization.

The method of the fundamental structure directly cools down the catalyst. This structure enhances the cooling efficiency and enables the catalyst to be kept within an active temperature range, thereby sufficiently reducing the concentration of carbon monoxide included in the hydrogen-rich gas.

In accordance with one preferable application, the method of the fundamental structure further includes the steps of:

(d) measuring a temperature of the catalyst; and (e) regulating an amount of water supply in the step (c), thereby enabling the temperature of said catalyst to be kept within a predetermined range.

Regulation of the amount of water supply in the step (c) enables the temperature of the catalyst measured in the step (d) to be kept within a desired temperature range, that is, the active temperature range, thereby effectively reducing the concentration of carbon monoxide included in the hydrogen-rich gas.

In accordance with another preferable application, the method of the fundamental structure further includes the steps of:

(f) measuring a concentration of carbon monoxide included in the hydrogen-rich gas;

(g) regulating an amount of oxidizing gas supply in the step (a) according to the concentration of carbon monoxide; and (h) regulating an amount of water supply in the step (c) according to the regulated amount of oxidizing gas supply.

In response to an increase in concentration of carbon monoxide included in the hydrogen-rich gas, the amount of oxidizing gas supply is increased to enhance the progress of the oxidative reaction in the step (f) and thereby reduce the concentration of carbon monoxide included in the hydrogen-rich gas. The enhanced progress of the oxidative reaction increases the heat generated by the oxidative reaction. Regulation of the amount of water supply according to the regulated amount of oxidizing gas supply enables the degree of cooling the catalyst to be specified according to the amount of heat generated by the oxidative reaction. This structure thus enables the catalyst to be kept within a desired temperature range and effectively reduces the concentration of carbon monoxide included in the hydrogen-rich gas.

In accordance with still another preferable application, the method of the fundamental structure further includes the steps of:

(i) detecting a progress of an oxidative reaction accelerated by the catalyst; and (j) regulating an amount of water supply in the step (c) according to the progress of the oxidative.

In the step (j) of this method, the amount of water supply in the step (c) is regulated according to the progress of the oxidative reaction detected in the step (i). Since the oxidative reaction carried out in the presence of the catalyst in the step (b) is exothermic, the enhanced progress of the oxidative reaction increases the temperature of the catalyst. Varying the amount of water supply in the step (c) changes the degree of cooling the catalyst. Regulation of the amount of water supply according to the progress of the oxidative reaction thereby controls the degree of cooling the catalyst.

The method of this structure enables the catalyst to be kept within a desired temperature range, that is, the active temperature range, thereby effectively reducing the concentration of carbon monoxide included in the hydrogen-rich gas.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
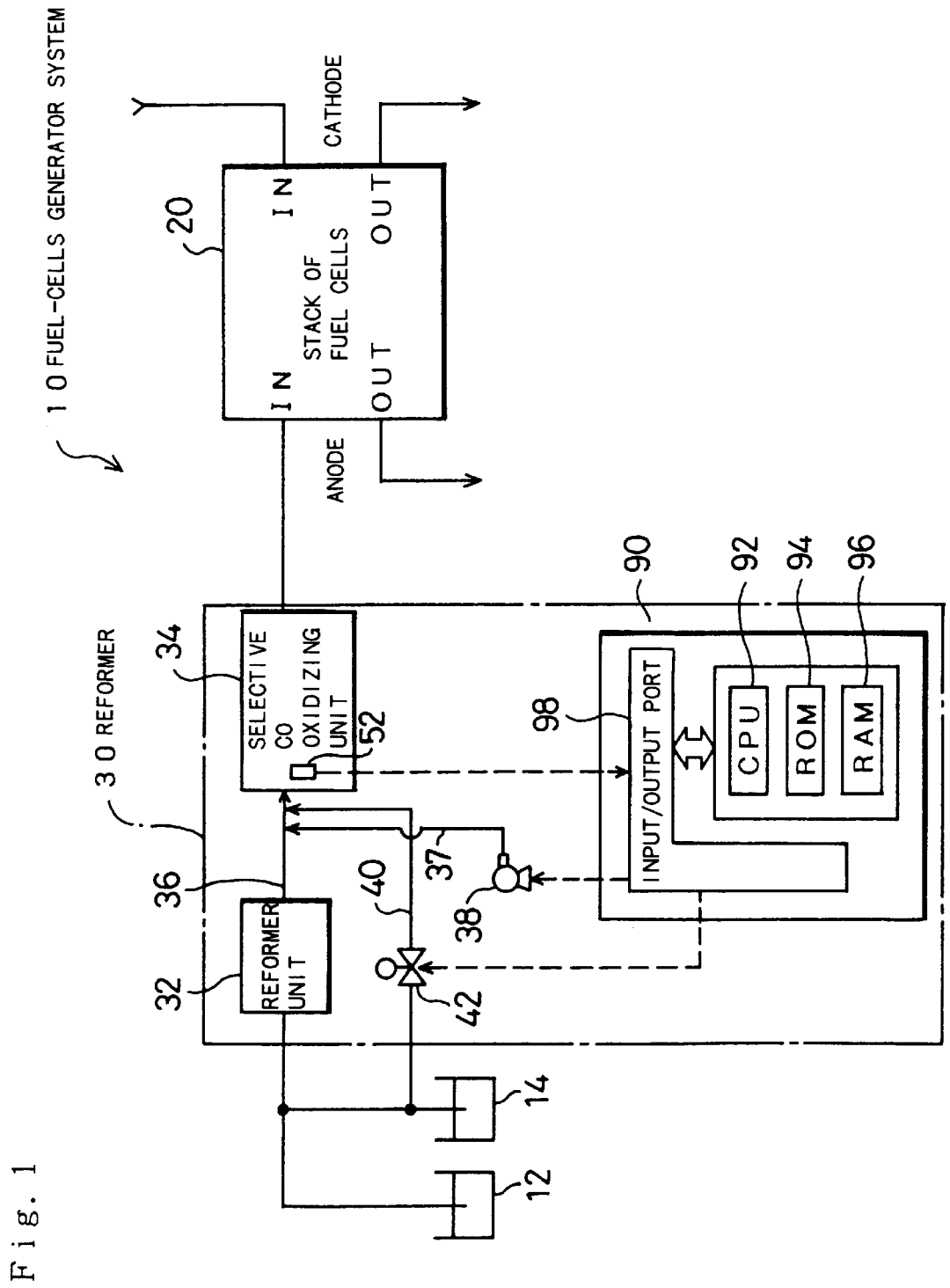
FIG. 1 is a block diagram schematically illustrating structure of a fuel-cells generator system 10 including an apparatus for reducing the concentration of carbon monoxide as a first embodiment according to the present invention.

Some modes of carrying out the present invention are discussed below as preferred embodiments. FIG. 1 is a block diagram schematically illustrating structure of a fuel-cells generator system 10 including an apparatus for reducing the concentration of carbon monoxide as a first embodiment according to the present invention. The fuel-cells generator system 10 includes a methanol tank 12 for storing methanol, a water tank 14 for storing water, a reformer 30 for receiving supplies of methanol and water fed from the methanol tank 12 and the water tank 14 and producing a hydrogen-containing gaseous fuel, and a stack of fuel cells 20. The stack of fuel cells 20 includes polymer electrolyte fuel cells that receive supplies of the gaseous fuel produced by the reformer 30 and an oxygen-containing oxidizing gas, for example, the air, and generating electricity.

Figure 2:
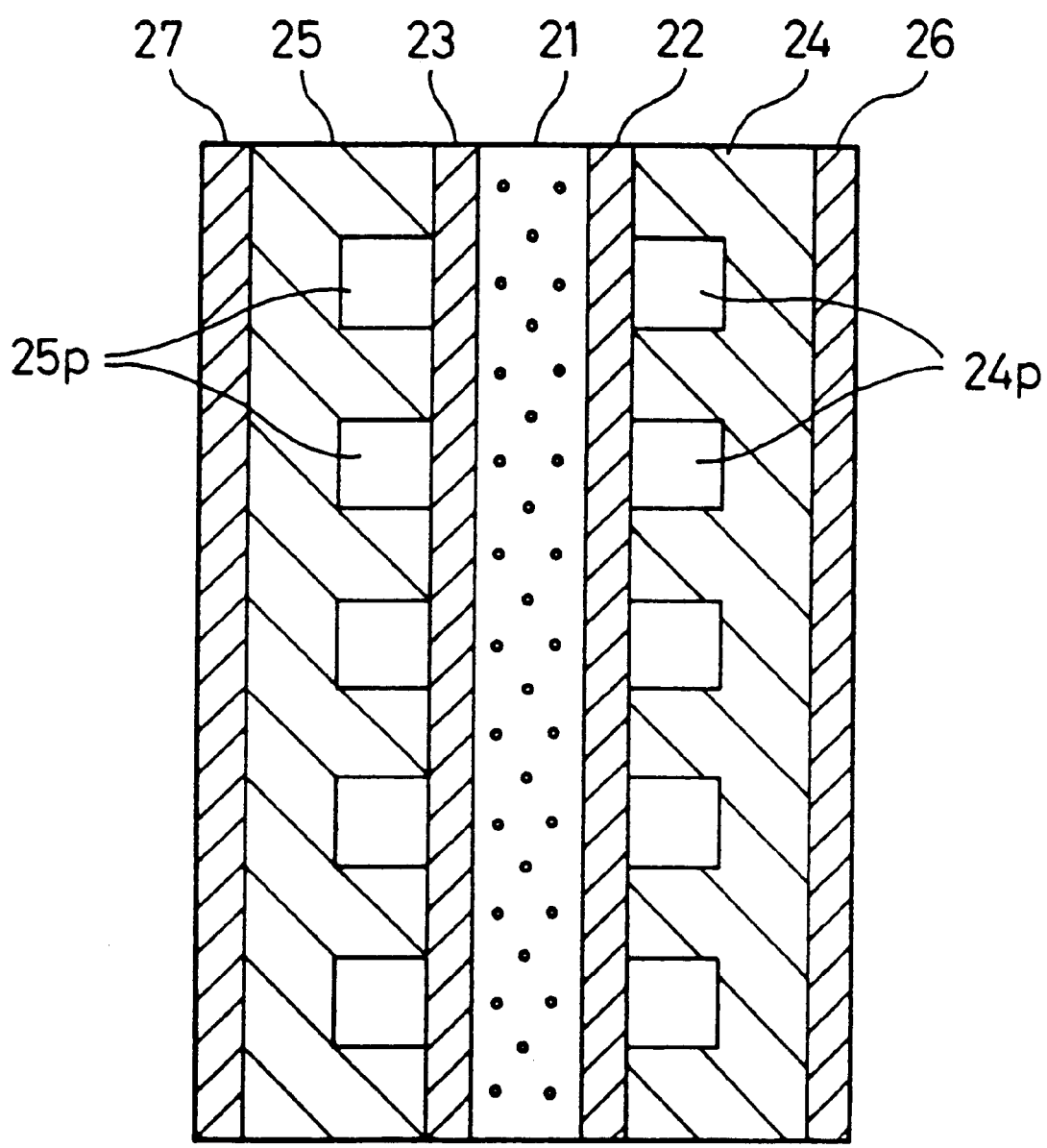
FIG. 2 illustrates a unit cell structure in a stack of fuel cells 20.

The stack of fuel cells 20 consists of polymer electrolyte fuel cells as mentioned above, and each unit cell has the structure shown in FIG. 2. Each unit cell has an electrolyte membrane 21, an anode 22 and a cathode 23, which are gas diffusion electrodes arranged across the electrolyte membrane 21 to construct a sandwich-like structure, separators 24 and 25, which are disposed outside the sandwich-like structure and respectively connected to the anode 22 and the cathode 23 to form flow paths 24p of gaseous fuel and flow paths 25p of oxidizing gas, and collector plates 26 and 27, which are disposed further outside the separators 24 and 25 and function as current collectors of the anode 22 and the cathode 23.

The electrolyte membrane 21 is an ion-exchange membrane composed of a polymer material, such as a fluororesin, and shows favorable electrical conductivity in the wet state. The anode 22 and the cathode 23 are made of carbon paper, carbon sheet, or carbon cloth, wherein carbon powder with a platinum catalyst carried thereon is incorporated in the interstices of the carbon paper, carbon sheet, or carbon cloth.

The separators 24 and 25 are composed of a dense carbon plate. The separator 24 has a plurality of ribs that are combined with the surface of the anode 22 to define flow paths 24p of gaseous fuel, whereas the separator 25 has a plurality of ribs that are combined with the surface of the cathode 23 to define flow paths 25p of oxygen-containing gas. The collector plates 26 and 27 are made of copper (Cu).

The stack of fuel cells 20 is obtained by stacking plural sets of the unit cell structure, wherein the separator 24, the anode 22, the electrolyte membrane 21, the cathode 23, and the separator 25 are arranged in this sequence as shown in FIG. 2, and setting the collector plates 26 and 27 outside the stack of unit cell structures. Only the gas supply system on the anode's side is illustrated in FIG. 1, while the gas supply system on the cathode's side, the gas discharge system on the anode's side and the gas discharge system on the cathode's side are omitted from the illustration.

The reformer 30 includes a reformer unit 32 for receiving supplies of methanol and water and generating a hydrogen-rich gas (reformed gas), a selective CO oxidizing unit 34 for selectively oxidizing carbon monoxide included in the reformed gas and thereby converting the reformed gas to a hydrogen-rich gas containing a less amount of carbon monoxide (gaseous fuel), a connection pipe 36 for feeding the reformed gas generated by the reformer unit 32 to the selective CO oxidizing unit 34, a blower 38 for feeding an oxygen-containing oxidizing gas, for example, the air, to the connection pipe 36 via an induction pipe 37 connecting with the connection pipe 36, a water inlet pipe 40 arranged down the Joint of the connection pipe 36 with the induction pipe 37 for introducing water into the connection pipe 36, and an electronic control unit 90 for controlling operations of the respective elements of the reformer 30.

The reformer unit 32 receives supplies of methanol and water from the methanol tank 12 and the water tank 14 and generates a reformed gas containing hydrogen and carbon dioxide as shown in Equations (1) and (2) given below (Equation (3) as a whole):

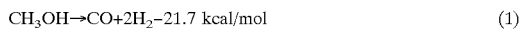
$$CH_3OH \rightarrow CO+2H_2-21.7 \text{ kcal/mol} \quad (1)$$

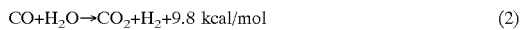
$$CO+H_2O \rightarrow CO_2+H_2+9.8 \text{ kcal/mol} \quad (2)$$

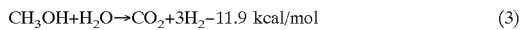
$$CH_3OH+H_2O \rightarrow CO_2+3H_2-11.9 \text{ kcal/mol} \quad (3)$$

In the actual state, the reactions of Equations (1) and (2) do not completely proceed to the right. The reformed gas produced by the reformer unit 32 includes small amounts of carbon monoxide as by-product and non-reacted methanol. The concentration of carbon monoxide included in the reformed gas depends upon the type of the catalyst packed in the reformer unit 32, the operating temperature of the reformer unit 32, and the flow rates of methanol and water supplied to the reformer unit 32 per unit volume of the catalyst. Although not being illustrated, the reformer unit 32 is electrically connected to the electronic control unit 90. The electronic control unit 90 regulates the supplies of methanol and water to the reformer unit 32.

Figure 3:
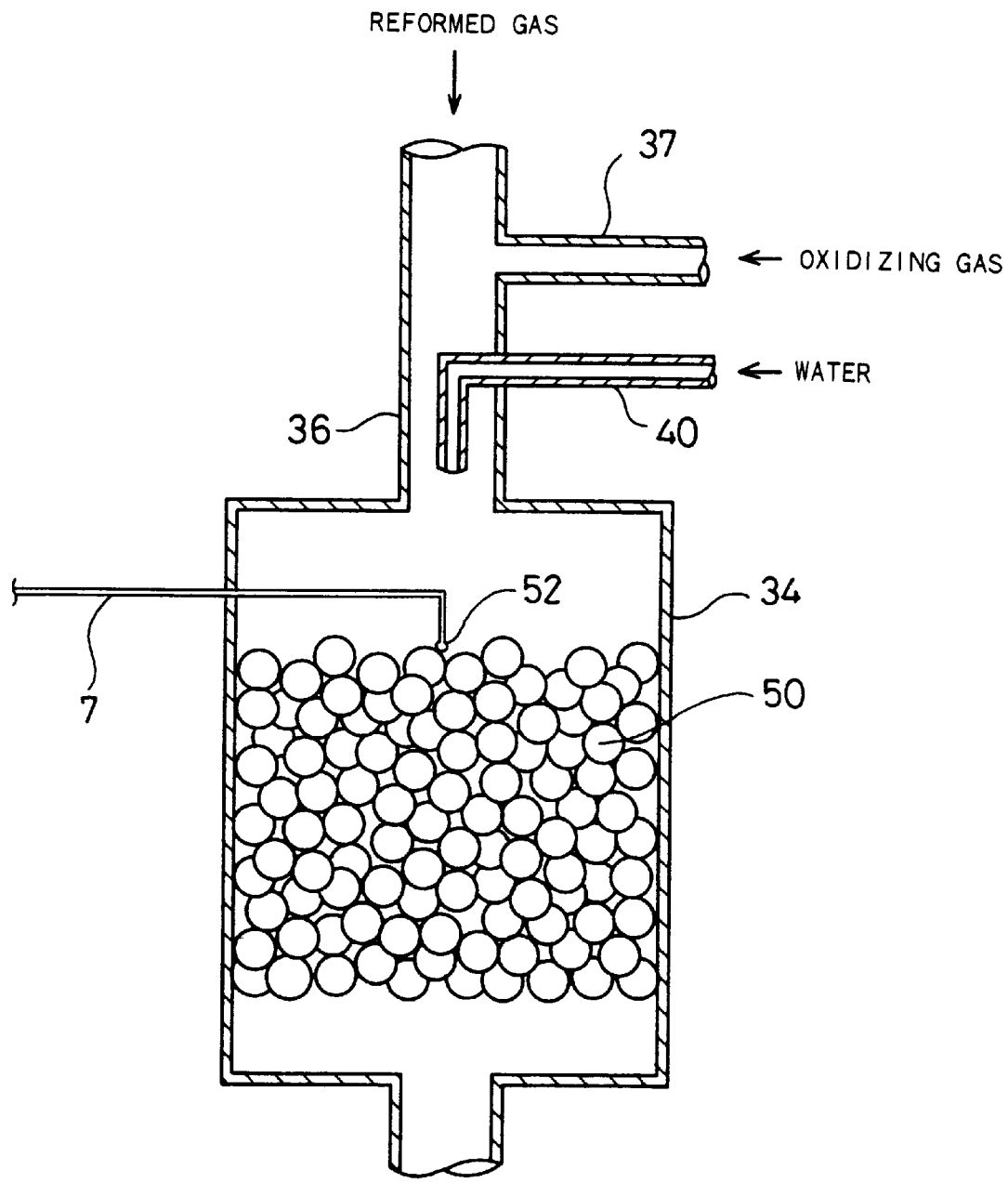
FIG. 3 shows inside of a selective CO oxidizing unit 34 with a connection pipe 36 connected thereto.

FIG. 3 shows the inside of the selective CO oxidizing unit 34 and the connection pipe 36, which is linked with the selective CO oxidizing unit 34. The reformed gas produced by the reformer unit 32 and the oxidizing gas fed from the blower 38 through the induction pipe 37 are led into the selective CO oxidizing unit 34 via the connection pipe 36. The selective CO oxidizing unit 34 is packed with selective CO oxidizing catalysts 50, which include aluminum oxide with platinum carried on the surface thereof. The selective CO oxidizing catalysts 50 enable carbon monoxide included in the reformed gas to be oxidized preferentially over hydrogen, thereby converting the reformed gas to a gaseous fuel having a low concentration of carbon monoxide.

As shown in FIG. 3, the water inlet pipe 40 is inserted into the connection pipe 36, and the selective CO oxidizing unit 34 receives a supply of water from the water inlet pipe 40 via the connection pipe 36. The oxidative reaction in the selective CO oxidizing unit 34 is exothermic and accordingly increases the temperature in the selective CO oxidizing unit 34. Water fed from the water inlet pipe 40 through the connection pipe 36 is vaporized in the hot selective CO oxidizing unit 34. The heat of vaporization then cools down the selective CO oxidizing unit 34. A temperature sensor 52 is arranged to be in contact with the selective CO oxidizing catalysts 50 in the selective CO oxidizing unit 34. The temperature sensor 52 consists of thermocouples and measures the internal temperature of the selective CO oxidizing unit 34. The temperature sensor 52 is electrically connected to the electronic control unit 90.

Referring back to FIG. 1, an electrically-operated valve 42 is disposed in the middle of the water inlet pipe 40 and is electrically connected to the electronic control unit 90. The electronic control unit 90 controls off and on the electrically-operated valve 42, in order to start and stop a supply of water to the selective CO oxidizing unit 34.

Figure 4:
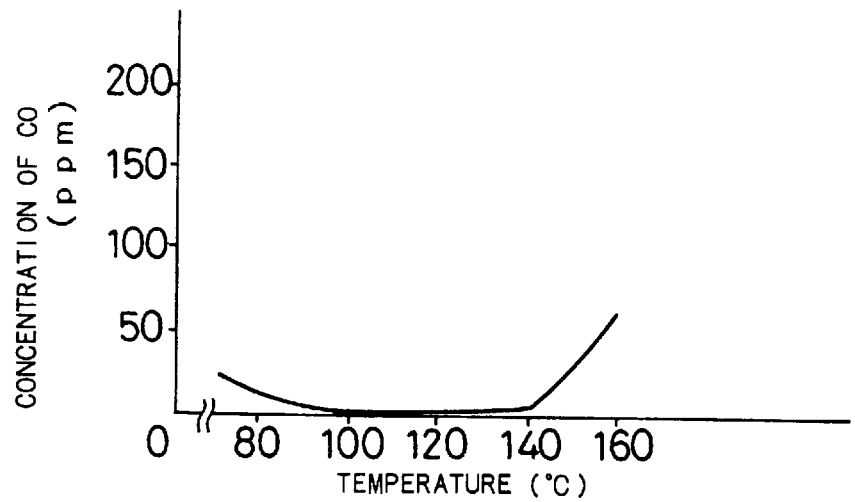
FIG. 4 is a graph showing the performance of selective CO oxidizing catalysts 50 with respect to a model gas.

The selective CO oxidizing catalysts 50 packed in the selective CO oxidizing unit 34 are obtained by making a platinum catalyst carried on the surface of an aluminum oxide carrier. FIG. 4 is a graph showing the performance of the selective CO oxidizing catalysts 50 against a model gas.

The model gas used here was prepared by introducing water vapor to a bottled gas, which had a predetermined composition of $CO_2$=25%, CO=0.1%, and $H_2$=the residual percent, with a bubbler to the absolute humidity of approximately 20%. A mixture of the model gas with an oxidizing gas (the resulting molar ratio of oxygen to carbon monoxide $[O_2]/[CO]$=3) was flown into the catalysts at a predetermined flow rate, which corresponded to the volume of approximately 5,000 times as much as the total volume of the catalysts per hour on the dry gas basis.

Referring to the graph of FIG. 4, the selective CO oxidizing catalysts 50 lowered the concentration of carbon monoxide included in the reformed gas after the catalytic reaction to or below a detection limit (that is, to or below several ppm) at the reaction temperatures of 100° C. to 140° C.

Regulation of the operating temperature of the selective CO oxidizing unit 34 to the range of 100° C. to 140° C. (hereinafter referred to as the optimum temperature range) significantly lowers the concentration of carbon monoxide included in the gaseous fuel. In this embodiment, the electronic control unit 90 opens or closes the electrically-operated valve 42 based on the results of measurement of the temperature sensor 52, thus enabling the operating temperature of the selective CO oxidizing unit 34 to be kept within the optimum temperature range.

Referring back to FIG. 1, the electronic control unit 90 is constructed as a microcomputer-based logic circuit, and includes a CPU 92 for executing a variety of logic and arithmetic operations according to preset control programs, a ROM 94, in which control programs and control data required for the variety of logic and arithmetic operations executed by the CPU 92 have been stored in advance, a RAM 96, which various data required for the variety of logic and arithmetic operations executed by the CPU 92 are temporarily written in and read from, and an input/output port 98 for receiving detection signals from the temperature sensor 52 and the other various sensors (not shown) and outputting driving signals, for example, to the blower 38 and the electrically-operated valve 42, based on the results of logic and arithmetic operations executed by the CPU 92.

Figure 5:
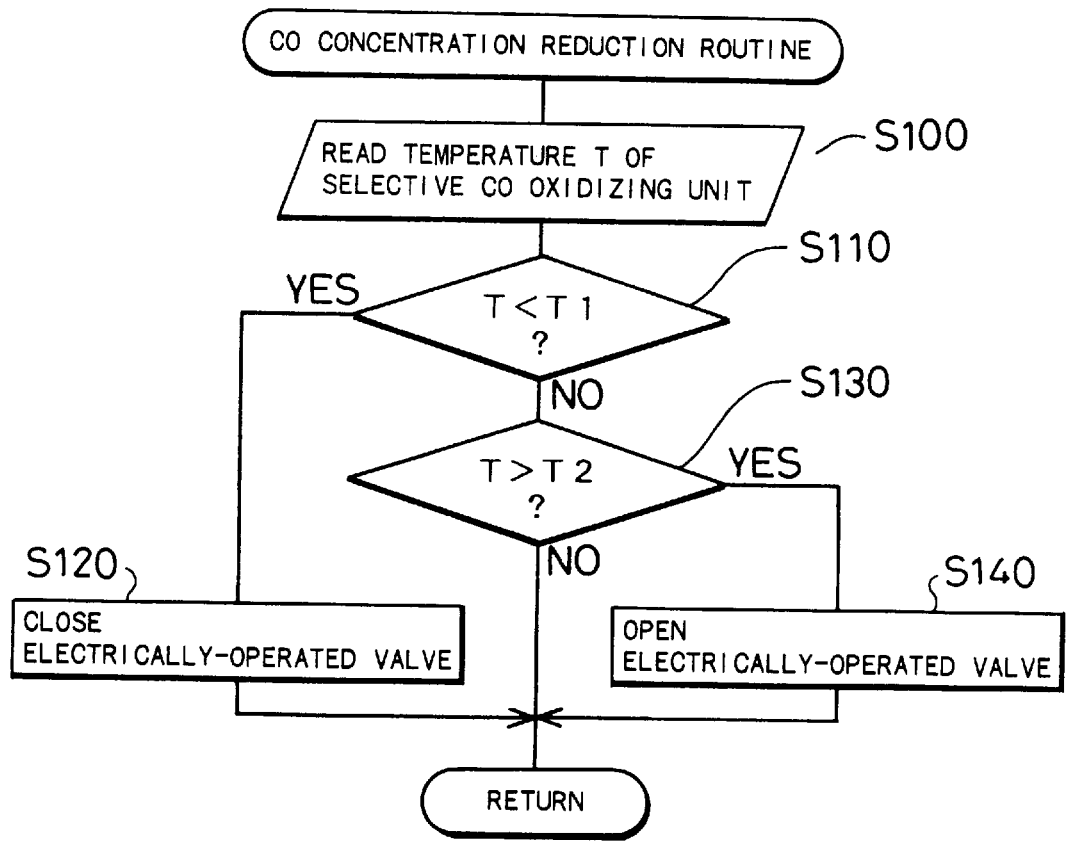
FIG. 5 is a flowchart showing a CO concentration reduction routine executed by the electronic control unit 90 of a reformer 30.

The electronic control unit 90 of the fuel-cells generator system 10 thus constructed carries out a control operation for decreasing the concentration of carbon monoxide included in the gaseous fuel, based on a routine of reducing CO concentration shown in the flowchart of FIG. 5. The routine of FIG. 5 is repeatedly carried out at predetermined time intervals, for example, at every 100 msec, after the reformer 30 has been driven and reached a stationary state.

When the program enters the routine of FIG. 5, the CPU 92 first reads a temperature T in the selective CO oxidizing unit 34 measured by the temperature sensor 52 via the input/output port 98 at step S100. The observed temperature T is compared with a lower limit T1 at step S110. The lower limit T1, which corresponds to the lower limit of the optimum temperature range of the selective CO oxidizing unit 34, is equal to 100° C. and stored in the ROM 94 in this embodiment. In case that the observed temperature T is lower than the lower limit T1 at step S110, the program goes to step S120 to switch a position V of the electrically-operated valve 42 disposed in the water inlet pipe 40 to a closed state. This switching operation stops the supply of water through the water inlet pipe 40 to the selective CO oxidizing unit 34, and thereby increases the internal temperature of the selective CO oxidizing unit 34 that has not been cooled by the supplied water.

When the answer is negative at step S110, that is, in case that the observed temperature is not lower than the lower limit T1, on the other hand, the program proceeds to step S130, at which the observed temperature T is further compared with an upper limit T2. The upper limit T2, which corresponds to the upper limit of the optimum temperature range of the selective CO oxidizing unit 34, is equal to 140° C. and stored in the ROM 94 in this embodiment. In case that the observed temperature T is higher than the upper limit T2 at step S130, the program goes to step S140 to switch the position V of the electrically-operated valve 42 disposed in the water inlet pipe 40 to an open state (either a full-open state or a partially-open state with a predetermined opening). This switching operation starts the supply of water through the water inlet pipe 40 to the selective CO oxidizing unit 34, and thereby enables the internal temperature of the selective CO oxidizing unit 34 to be decreased by the heat of vaporization of the supplied water.

After the execution of either one of steps S120 and S140 or after the negative answer at step S130, the program exits from this routine.

The CO concentration reduction routine controls on and off the electrically-operated valve 42 according to the internal temperature of the selective CO oxidizing unit 34 measured by the temperature sensor 52. In case that the temperature T in the selective CO oxidizing unit 34 rises too high, the supplied water cools down the selective CO oxidizing unit 34. In case that the temperature T is too low, on the contrary, the supply of water for cooling is stopped. This procedure enables the operating temperature of the selective CO oxidizing unit 34 to be kept within the optimum temperature range of T1 to T2. Although the first embodiment does not take into account a time lag between the supply of water to the selective CO oxidizing unit 34 and an actual temperature change, one preferable modification adds a predetermined value α to the lower limit T1 and subtracts a predetermined value β from the upper limit T2, with a view to taking into account the time lag.

As discussed above, in the fuel-cells generator system 10 of the first embodiment, water is supplied through the water inlet pipe 40 to the selective CO oxidizing unit 34 and the selective CO oxidizing unit 34 is cooled down by the heat of vaporization of supplied water. The heat of vaporization of supplied water directly cools down the selective CO oxidizing catalysts 50 packed in the selective CO oxidizing unit 34. This enhances the cooling efficiency and enables all the selective CO oxidizing catalysts 50 packed in the selective CO oxidizing unit 34 to be maintained within an active temperature range. The structure of the embodiment thus sufficiently reduces the concentration of carbon monoxide included in the gaseous fuel.

It is required to moisten the gaseous fuel fed to the stack of fuel cells 20. The structure of the first embodiment can decrease the required amount of water added to the gaseous fuel for the purpose of moistening by the amount of water fed to the selective CO oxidizing unit 34 for the purpose of cooling. This structure uses water for the cooling purpose and does not require any additional supply of energy for cooling down the selective CO oxidizing unit 34. Whereas the conventional technique requires additional energy for cooling down a cooling medium, which receives the heat from the selective CO oxidizing unit 34 and, for example, passes through a radiator, the fuel-cells generator system 10 of the embodiment does not require such additional energy.

The fuel-cells generator system 10 of the first embodiment measures the internal temperature of the selective CO oxidizing unit 34 with the temperature sensor 52, and starts or stops the supply of water through the water inlet pipe 40 based on the results of measurement by the temperature sensor 52. This structure enables the operating temperature of the selective CO oxidizing unit 34 to be kept within the active temperature range of the selective CO oxidizing catalysts 50, thereby reducing the concentration of carbon monoxide included in the gaseous fuel.

Figure 6:
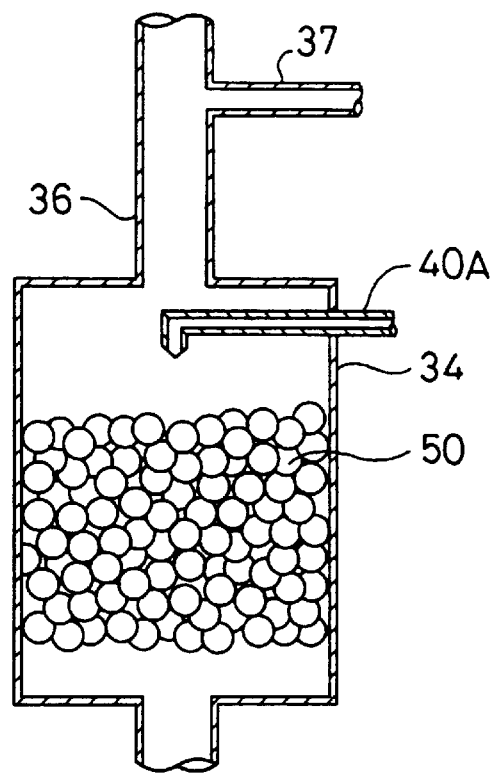
FIG. 6 shows inside of the selective CO oxidizing unit 34 with another water supply means.

In the first embodiment, water is supplied from the water inlet pipe 40 through the connection pipe 36 to the selective CO oxidizing unit 34. As shown in FIG. 6, one modified structure has a water inlet pipe 40A inserted into the selective CO oxidizing unit 34. Water flowing through the water inlet pipe 40A is thus directly sprinkled into the selective CO oxidizing unit 34.

Figure 7:
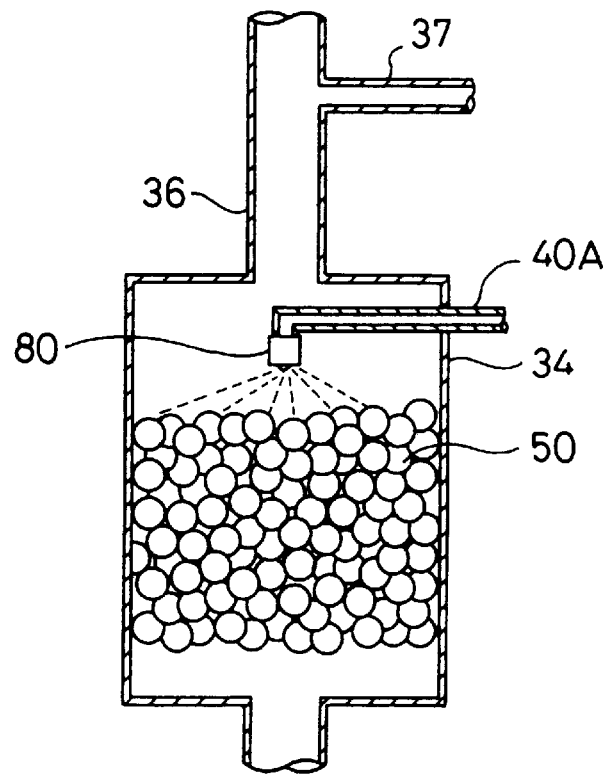
FIG. 7 shows inside of the selective CO oxidizing unit 34 with still another water supply means.

This modified structure preferably has a water injection valve 80 attached to the free end of the water inlet pipe 40A for spraying water in a wide angle as shown in FIG. 7. One available water injection valve is a spiral injection valve utilizing revolutions of a liquid. The spiral injection valve is a known device specified in, for example, 'pp 192–201, Kikaikogaku-kisokoza, Nenshokogaku, Kiso-to-oyo (Fundamental Lectures of Mechanical Engineering, Combustion Engineering, Fundamentals and Applications), Kiyoshi KOBAYASHI, Rikougaku Co., Ltd.' The spiral injection valve realizes favorable atomization even under a low injection pressure and enables the spray angle and the flow rate to be freely designed. The spiral injection valve allows water to be atomized to the particle diameter of 15 μm, sprayed in the spray angle of 150 degrees, and directly sprinkled onto a wide area of the selective CO oxidizing catalysts 50. This structure quickly cools down a wide area of the selective CO oxidizing catalysts 50, thereby homogeneously cooling down the whole selective CO oxidizing unit 34.

Figure 8:
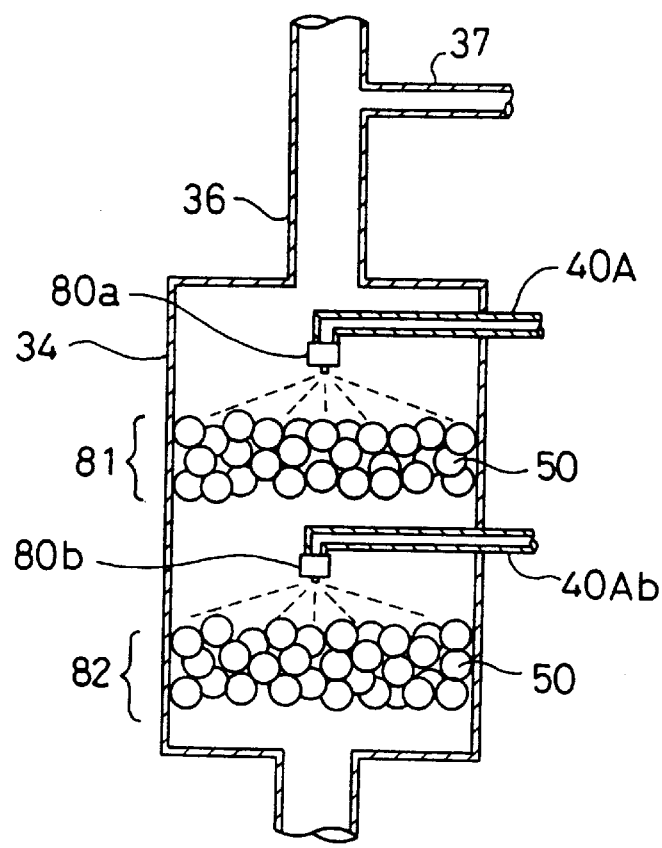
FIG. 8 shows inside of the selective CO oxidizing unit 34 with another water supply means.

Although the modified structure shown in FIG. 7 has only one water inlet pipe 40A, another possible structure may have a plurality of water inlet pipes. FIG. 8 shows the inside of the selective CO oxidizing unit 34 with two water inlet pipes 40Aa and 40Ab. In this modified example, the selective CO oxidizing catalysts 50 are divided into two groups 81 and 82 along the flow direction of the reformed gas in the selective CO oxidizing unit 34, and the water inlet pipes 40Aa and 40Ab are respectively disposed to sprinkle water onto the groups 81 and 82. Spiral injection valves 80a and 80b are respectively attached to the ends of the water inlet pipes 40Aa and 40Ab.

Compared with the structure of FIG. 7, the structure of FIG. 8 can double the area of the selective CO oxidizing catalysts 50, onto which water is directly sprinkled, thereby more homogeneously cooling down the whole selective CO oxidizing unit 34 and sufficiently reducing the concentration of carbon monoxide included in the gaseous fuel.

Reduction of the concentration of carbon monoxide was evaluated in the modified structure of FIG. 7 and the modified structure of FIG. 8. The model gas used here was a hydrogen-rich gas having the concentration of carbon monoxide equal to 0.6%. A mixture of the model gas with an oxidizing gas (the resulting molar ratio of oxygen to carbon monoxide $[O_2]/[CO]=3$) was flown into the selective CO oxidizing catalysts 50, and the flow rate of water was 1.36 mol/min.

In the structure of FIG. 7 with one water inlet pipe 40A, the concentration of carbon monoxide included in the hydrogen-rich gas output from the selective CO oxidizing unit 34 was 30 ppm. In the structure of FIG. 8 with two water inlet pipes 40Aa and 40Ab, on the other hand, the concentration of carbon monoxide included in the hydrogen-rich gas output from the selective CO oxidizing unit 34 was 10 ppm. This measurement shows that the structure with a plurality of water inlet pipes can reduce the concentration of carbon monoxide included in the hydrogen-rich gas more effectively than the structure with one water inlet pipe.

Figure 9:
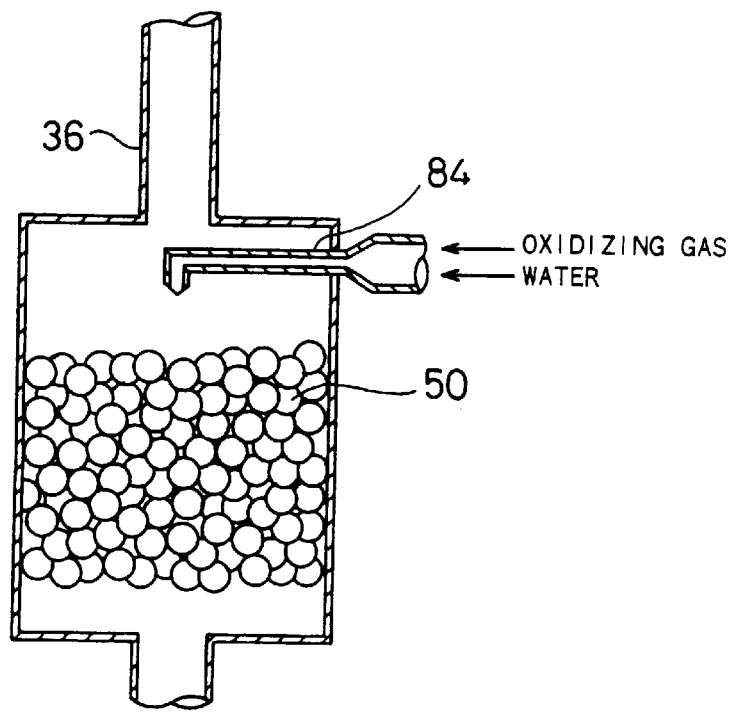
FIG. 9 shows inside of the selective CO oxidizing unit 34 with still another water supply means.

In the first embodiment and its modified structures, the supplies of oxidizing gas and water are fed through separate pipes to the selective CO oxidizing unit 34. As shown in FIG. 9, however, the supplies of oxidizing gas and water may be fed together through an induction pipe 84 inserted into the selective CO oxidizing unit 34. This structure enables water to be sprayed by the oxidizing gas, so that the mechanism of spraying water can be simplified.

In the first embodiment and its modified structures (except the structure of FIG. 9), the water inlet pipe is arranged down the induction pipe of the oxidizing gas. Another possible structure may, however, arrange the water inlet pipe up the induction pipe of the oxidizing gas.

In the first embodiment discussed above, the selective CO oxidizing catalysts 50 include an aluminum oxide carrier with the platinum catalyst carried thereon. Other available carriers include silicon oxides, zirconium oxides, cerium oxide, zinc oxide, calcium carbonate, copper oxides, iron oxides, titanium oxides, cobalt oxides, and yttria-partially-stabilized zirconia. Other available catalysts carried on the carrier include rare metals, such as Pd, Ru, Rh, Ir, and Au, and non-rare metals, such as Ni, Co, Cu, and Fe.

In the first embodiment discussed above, the supply of water through the water inlet pipe 40 is started and stopped according to the observed temperature T in the selective CO oxidizing unit 34. Another possible structure regulates the amount of water supply through the water inlet pipe 40 according to the observed temperature T. In case that the temperature T in the selective CO oxidizing unit 34 rises too high, the electrically-operated valve 42 is driven in the opening direction by a predetermined amount. In case that the temperature T is too low, on the contrary, the electrically-operated valve 42 is driven in the closing direction by a predetermined amount. Still another possible structure intermittently feeds water and regulates the interval of water supply, thereby controlling the amount of water supply.

Figure 10:
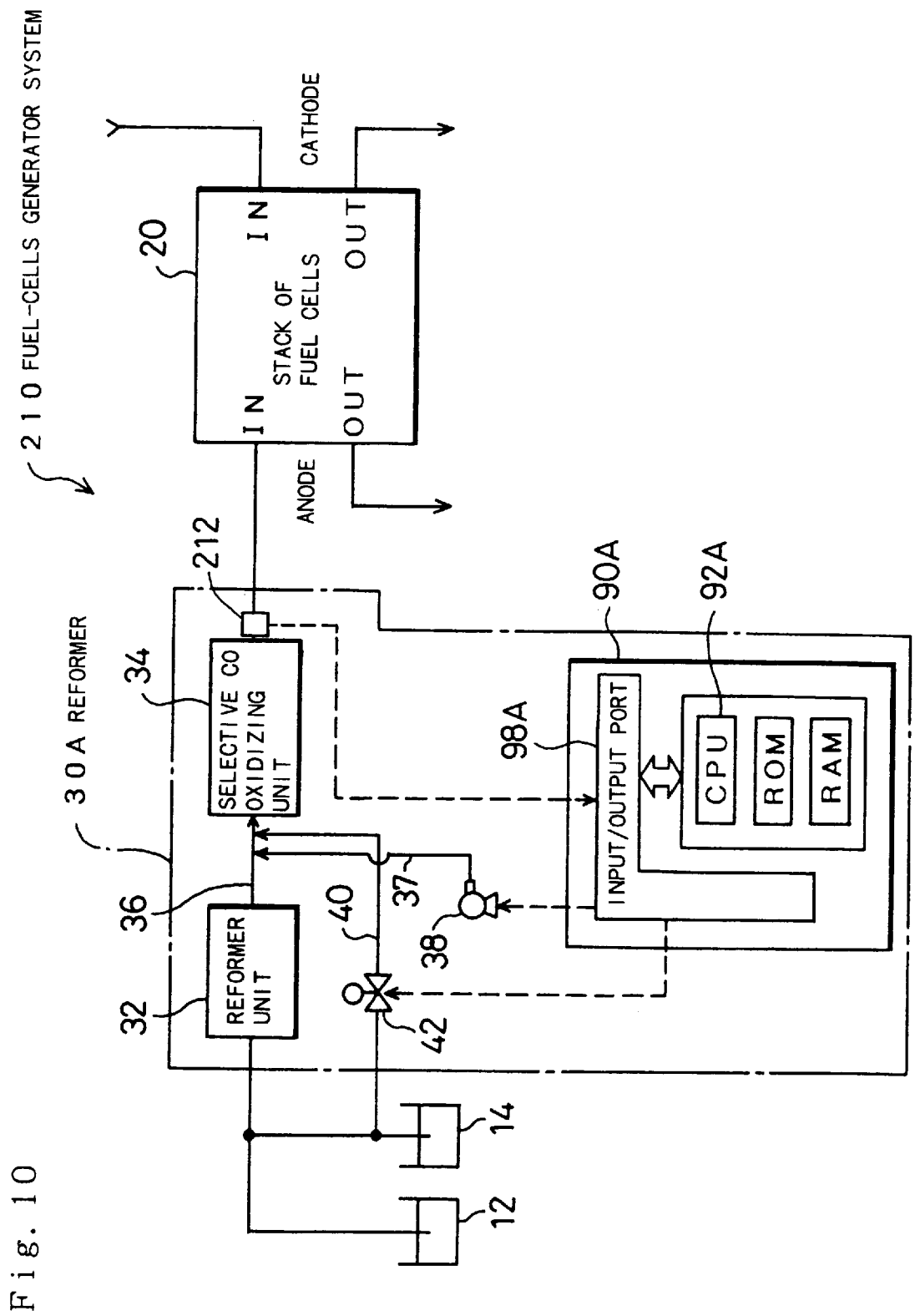
FIG. 10 is a block diagram schematically illustrating structure of another fuel-cells generator system 210 as a second embodiment according to the present invention.

The following describes another fuel-cells generator system 210 as a second embodiment according to the present invention. FIG. 10 is a block diagram schematically illustrating structure of the fuel-cells generator system 210 of the second embodiment. The fuel-cells generator system 210 of the second embodiment has a similar hardware structure to that of the fuel-cells generator system 10 of the first embodiment, except that the temperature sensor 52 is not set in the selective CO oxidizing unit 34 and that a carbon monoxide sensor 212 for measuring the concentration of carbon monoxide included in the gaseous fuel is disposed in the middle of a flow path connecting the selective CO oxidizing unit 34 to the stack of fuel cells 20. The same constituents are shown by like numerals and not specifically described here.

Figure 11:
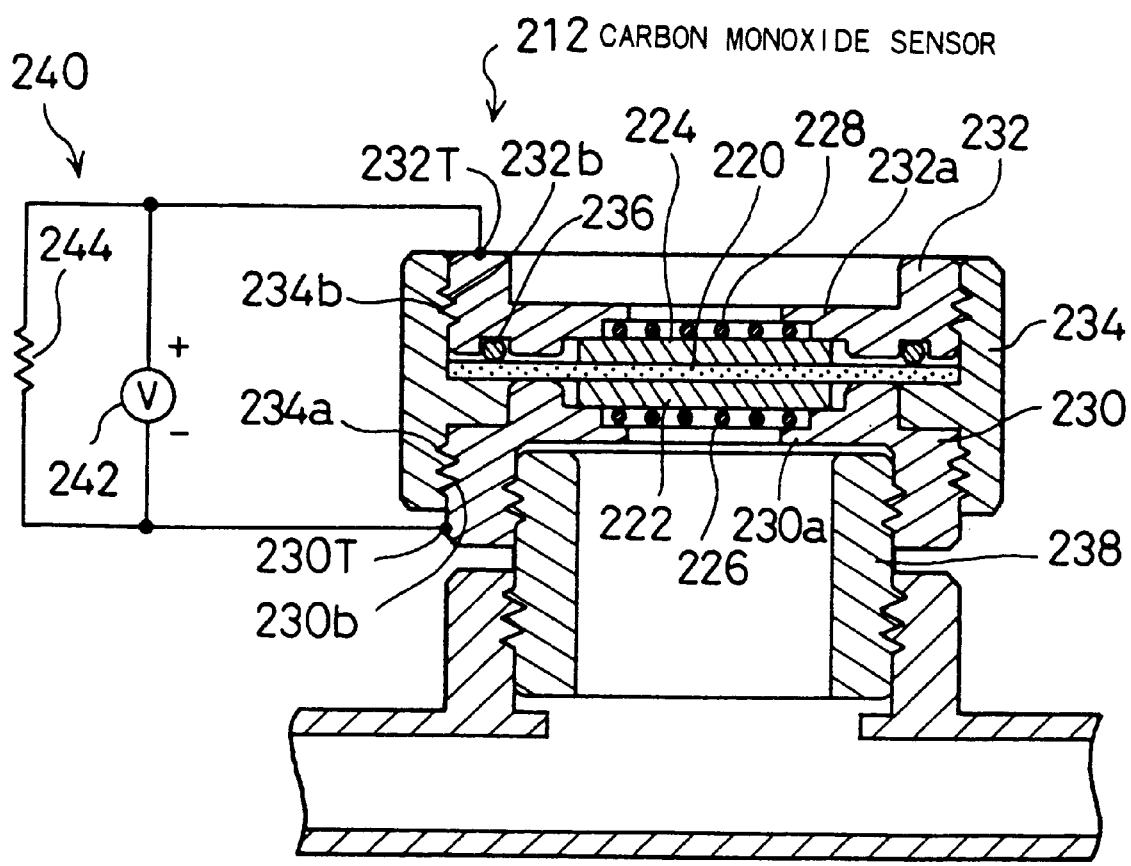
FIG. 11 is a vertical sectional view illustrating structure of a carbon monoxide sensor 212.

The following describes structure of the carbon monoxide sensor 212, based on the vertical sectional view of FIG. 11. The carbon monoxide sensor 212 includes an electrolyte membrane 220, two electrodes 222 and 224 arranged across the electrolyte membrane 220 to constitute a sandwich-like structure, two meshed metal plates 226 and 228 arranged across the sandwich-like structure for preventing deflection of the sandwich-like structure, two holders 230 and 232 for fixing the sandwich-like structure and the metal plates 226 and 228, and an insulating member 234 for coupling the holders 230 and 232 with each other in an electrically insulating state.

The electrolyte membrane 220 is a proton-conductive membrane composed of a polymer electrolyte material, such as a fluororesin. The electrodes 222 and 224 are made of an electrode base material, such as carbon paper, carbon sheet, or carbon cloth, wherein carbon powder with a platinum catalyst carried thereon is incorporated in the interstices of the electrode base material.

The meshed metal plates 226 and 228 have the structure that enables gases to be flown into the electrodes 222 and 224. Preferable material for the meshed metal plates 226 and 228 has excellent electrical conductivity and favorable rust-preventing properties and does not cause hydrogen brittleness; for example, titanium and stainless steel.

The holders 230 and 232 respectively have flanges 230a and 232a projected inward from the cylindrical holder structures 230 and 232. The electrolyte membrane 220, the pair of electrodes 222 and 224, and the meshed metal plates 226 and 228 are supported by these flanges 230a and 232a of the holders 230 and 232. Preferable material for the holders 230 and 232 has excellent electrical conductivity and favorable rust-preventing properties and does not cause hydrogen brittleness; for example, titanium and stainless steel. The holder 232 is provided with an O-ring 236, which comes into contact with the electrolyte membrane 220 and prevents an atmosphere of one electrode from leaking to the other electrode.

The holders 230 and 232 respectively have, on the circumference thereof, outer screw threads 230b and 232b, which mate and engage with inner screw threads 234a and 234b formed inside the insulating member 234. Engagement of the mating screw threads 230b, 232b and 234a, 234b enables the holders 230 and 232 to connect with each other and securely support the sandwich structure of electrode 222-electrolyte membrane 220-electrode 224 placed therebetween. Preferable material for the insulating member 234 is, for example, Teflon.

The carbon monoxide sensor 212 further includes a gas in-flow conduit 238 that is linked with one holder 230 via mating screw threads. The gas in-flow conduit 238 leads a gaseous fuel, that is, an object gas to be detected, into the electrode 222, and is composed of an insulating material. The other holder 232 does not connect with any specific gas conduit, but the electrode 234 is exposed to the atmosphere.

The carbon monoxide sensor 212 is also provided with an electric circuit 240, which electrically connects detection terminals 230T and 232T of the holders 230 and 232 with each other. The electric circuit 240 includes a voltmeter 242 and a resistor 244 for adjusting the load current, which are arranged in parallel between the detection terminals 230T and 232T. Connection of the voltmeter 242 is determined to give negative polarity to the detection terminal 230T of the holder 230 on the side of the electrode 222 exposed to the gaseous fuel and positive polarity to the detection terminal 232T of the holder 232 on the side of the electrode 224 exposed to the atmosphere. Signals of the voltmeter 242 are output to an external control system, that is, an electronic control unit 90A.

The carbon monoxide sensor 212 thus constructed is joined with the flow path, which connects the selective CO oxidizing unit 34 to the stack of fuel cells 20, via mating screw threads, and is used to measure the concentration of carbon monoxide in the gaseous fuel fed to the stack of fuel cells 20.

The following description regards the process of detecting carbon monoxide included in the hydrogen-rich gas (that is, the gaseous fuel or the object gas to be detected) with the carbon monoxide sensor 212. A supply of gaseous hydrogen included in the hydrogen-rich gas is fed to the electrode 222 of the carbon monoxide sensor 212, while a supply of oxygen included in the atmosphere is fed to the electrode 224. Reactions expressed by Equations (4) and (5) given below accordingly proceed on the surface of the electrodes 222 and 224 across the electrolyte membrane 220:

$$H_2 \rightarrow 2H^+ + 2e^- \quad (4)$$

$$2H^+ + 2e^- + (\tfrac{1}{2})O_2 \rightarrow H_2O \quad (5)$$

These reactions are identical with those proceeding in the fuel cells, which receive hydrogen and oxygen as fuels and generate electrical energy. An electromotive force is thus generated between the electrodes 222 and 224. Since the resistor 244 is connected between the electrodes 222 and 224 in this embodiment, the voltmeter 242 measures the potential difference between the electrodes 222 and 224 when a predetermined electric current is flown through the circuit under a predetermined loading connected between the electrodes 222 and 224. The potential difference decreases with an increase in concentration of carbon monoxide included in the object gas. This phenomenon is ascribed to the following reasons.

The reaction expressed by Equation (4) given above proceeds on the electrode 222, in which the carbon powder having the platinum catalyst carried thereon is incorporated. Carbon monoxide existing in the object gas is adsorbed by the catalyst and interferes with the catalytic action; namely, carbon monoxide poisons the catalyst. The degree of poisoning is large for the high concentration of carbon monoxide included in the object gas and small for the low concentration of carbon monoxide. The potential difference between the detection terminals 230T and 232T is measured, while the reactions expressed by Equations (4) and (5) continuously proceed on the electrodes 222 and 224. In this state, the potential difference reflects the concentration of carbon monoxide included in the object gas, and the measurement of potential difference determines the concentration of carbon monoxide included in the object gas. Connection of one detection terminal 230T with the other detection terminal 232T via the resistor 244 enables the reactions of Equations (4) and (5) to continuously proceed on the electrodes 222 and 224. Under such conditions, the potential difference is measured between the detection terminals 230T and 232T.

The relationship between the concentration of carbon monoxide and the measurement of the voltmeter 242 is examined in advance with gases containing known concentrations of carbon monoxide. The concentration of carbon monoxide included in the object gas is then determined according to this relationship. The existence of hydrogen does not affect the sensitivity of detection in the measurement of the concentration of carbon monoxide. The concentration of carbon monoxide included even in the hydrogen-rich object gas, that is, the gaseous fuel supplied to the fuel cells, can thus be determined with high accuracy.

Figure 12:
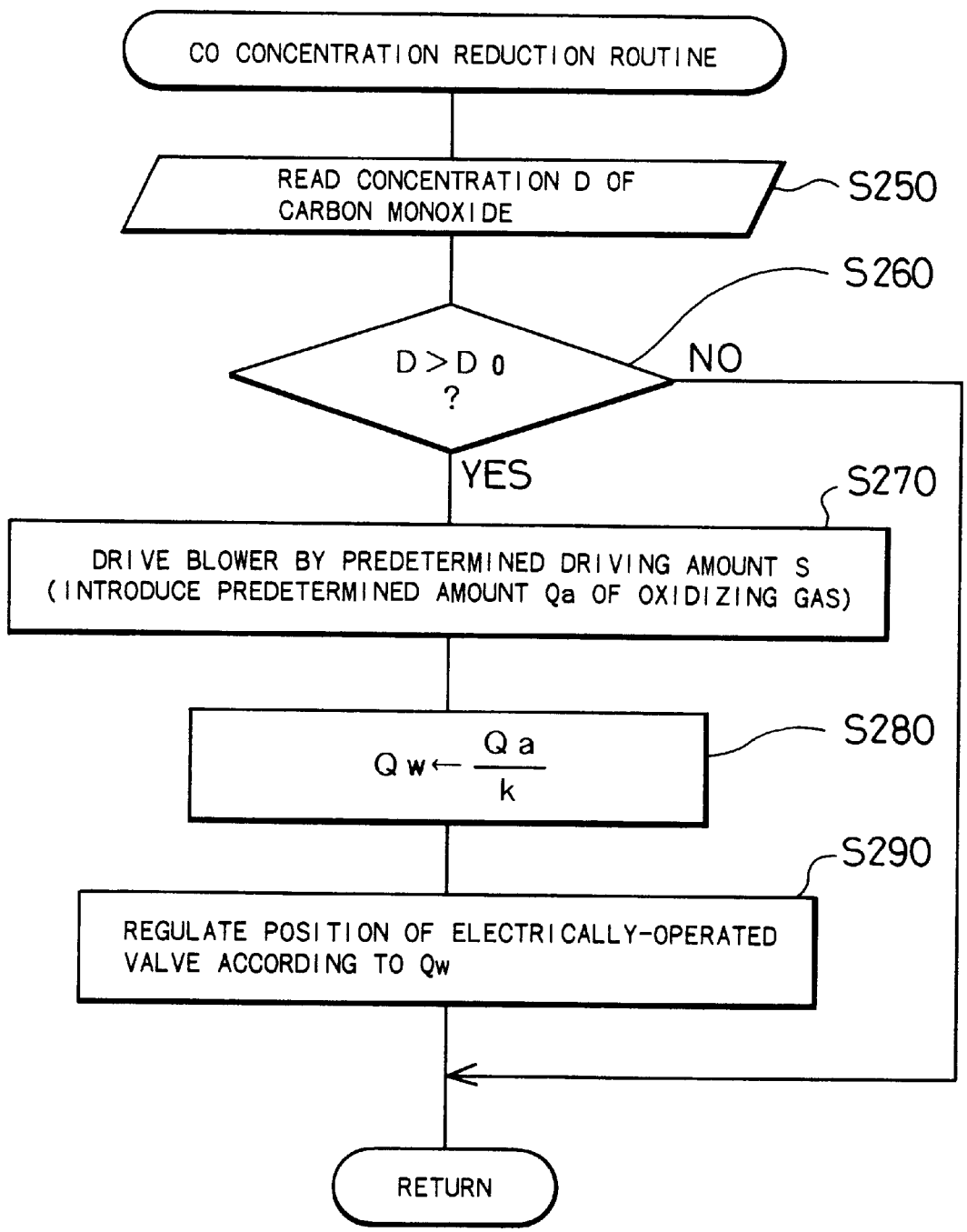
FIG. 12 is a flowchart showing a CO concentration reduction routine executed by the electronic control unit 90A of the second embodiment.

The electronic control unit 90A of the fuel-cells generator system 210 carries out a control operation for decreasing the concentration of carbon monoxide included in the gaseous fuel, which is different from that carried out in the first embodiment but is based on a routine of reducing CO concentration shown in the flowchart of FIG. 12. The routine of FIG. 12 is repeatedly carried out at predetermined time intervals, for example, at every 100 msec, after a reformer 30A has been driven and reached a stationary state.

When the program enters the routine of FIG. 12, a CPU 92A of the electronic control unit 90A reads a concentration D of carbon monoxide included the gaseous fuel at the outlet of the reformer 30A measured by the carbon monoxide sensor 212 via an input/output port 98A at step S250. The observed concentration D of carbon monoxide is compared with a predetermined value D0 at step S260. The predetermined value D0 represents an upper limit concentration of carbon monoxide that is allowable by the stack of fuel cells 20. In case that the observed concentration D of carbon monoxide is not greater than the predetermined value D0 at step S260, the program does not require any specific control and exits from this routine.

In case that the observed concentration D of carbon monoxide exceeds the predetermined value D0 at step S260, on the other hand, the program proceeds to step S270 to drive the blower 38 by a predetermined driving amount S, in order to enable a predetermined amount Qa of the oxidizing gas to be introduced into the selective CO oxidizing unit 34. A target amount Qw of water supply introduced into the selective CO oxidizing unit 34 is then calculated at step S280 by dividing the predetermined amount Qa of oxidizing gas that is specified at step S270 by a predetermined factor k. At subsequent step S290, the CPU 92A regulates the position of the electrically-operated valve 42 based on the target amount Qw of water supply, thereby enabling water of the target amount Qw to be fed through the water inlet pipe 40 to the selective CO oxidizing unit 34. Although the electrically-operated valve 42 is switched between the open position and the closed position in the first embodiment, the opening of the electrically-operated valve 42 is regulated in the second embodiment. After the execution of step S290, the program exits from this routine.

Figure 13:
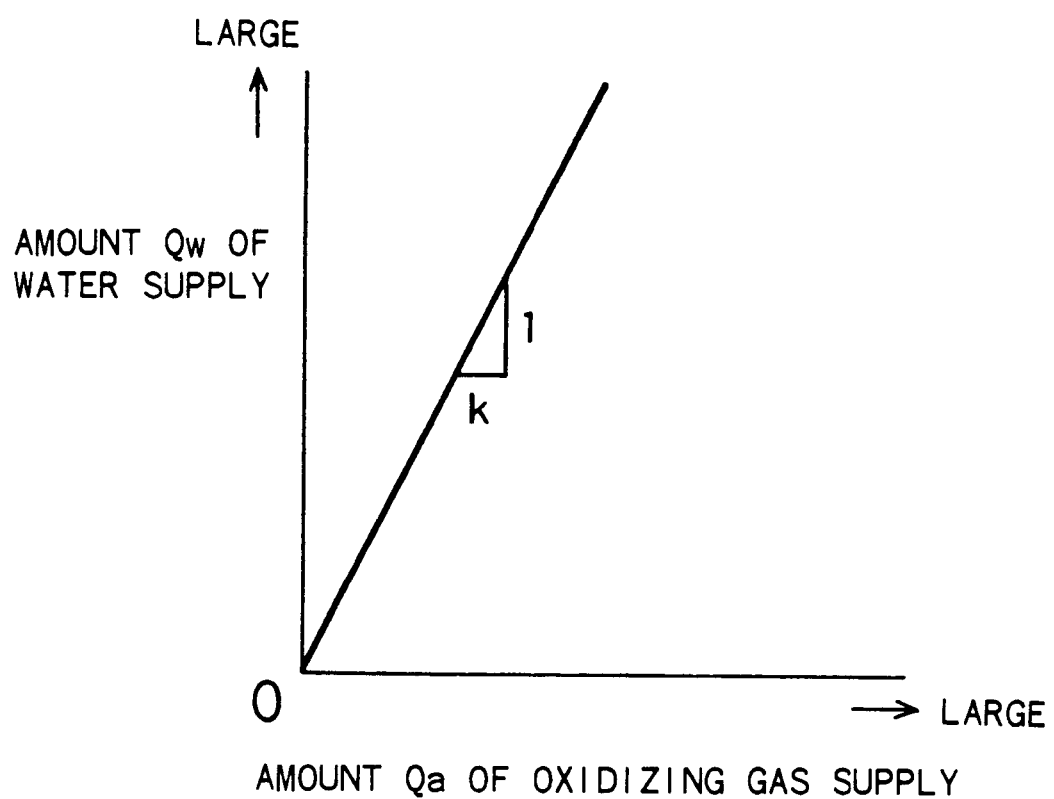
FIG. 13 is a graph showing the relationship between the amount Qa of oxidizing gas supply and the amount Qw of water supply.

When the concentration D of carbon monoxide increases to exceed the allowable level by the stack of fuel cells 20, the CO concentration reduction routine of the second embodiment causes the oxidizing gas of the predetermined amount Qa to be fed to the selective CO oxidizing unit 34 and water of the target amount Qw, which corresponds to the amount Qa of oxidizing gas supply, to be introduced into the selective CO oxidizing unit 34. The graph of FIG. 13 shows the amount Qw of water supply plotted against the amount Qa of oxidizing gas supply. As clearly seen from the graph of FIG. 13, the ratio of the amount Qa of oxidizing gas supply to the amount Qw of water supply to the selective CO oxidizing unit 34 is fixed to the factor k.

When the concentration of carbon monoxide included in the gaseous fuel increases to a high level, the structure of the second embodiment introduces the oxidizing gas into the selective CO oxidizing unit 34, thereby reducing the concentration of carbon monoxide through the oxidative reaction. Although the oxidative reaction is exothermic, the heat of vaporization of water introduced into the selective CO oxidizing unit 34 cools down the selective CO oxidizing unit 34. As discussed above, the fixed ratio of the amount Qa of oxidizing gas supply to the amount Qw of water supply determines the degree of cooling the selective CO oxidizing unit 34 in response to the amount of heat generated by the oxidative reaction.

This structure enables the operating temperature of the selective CO oxidizing unit 34 to be kept within the desired temperature range, that is, the active temperature range of the catalyst, thereby effectively reducing the concentration of carbon monoxide included in the gaseous fuel.

The structure of the second embodiment controls the amount Qw of water supply to keep a fixed ratio to the amount Qa of oxidizing gas supply. This simplifies the control procedure.

In the second embodiment, the predetermined amount Qa of the oxidizing gas is introduced into the selective CO oxidizing unit 34 when the observed concentration D of carbon monoxide rises to a high level. The amount Qa of oxidizing gas supply may, however, be varied according to the difference between the observed concentration D of carbon monoxide and the predetermined value D0. Namely this modified structure increases the amount Qa of oxidizing gas supply with an increase in difference. This enables the concentration D of carbon monoxide to be quickly decreased to or below the predetermined value D0. Even in the modified structure with the varying amount Qa of oxidizing gas supply, since the amount Qw of water supply is controlled to keep a fixed ratio to the amount Qa of oxidizing gas supply, the operating temperature of the selective CO oxidizing unit 34 is effectively kept within the desired temperature range.

The second embodiment reduces the concentration of carbon monoxide by introducing the predetermined amount Qa of the oxidizing gas to the selective CO oxidizing unit 34 when the observed concentration D of carbon monoxide rises to a high level. One modified structure continuously introduces a fixed amount of the oxidizing gas into the selective CO oxidizing unit 34 and increases the oxidizing gas supply by a predetermined amount when the observed concentration D of carbon monoxide rises to a high level. In this case, the amount of water supply is controlled to keep a fixed ratio to the increased amount of oxidizing gas supply. The structure of the second embodiment that introduces the predetermined amount Qa of the oxidizing gas into the selective CO oxidizing unit 34 in response to an increase in concentration D of carbon monoxide to a high level may be generalized and applied to the structure of the first embodiment.

The second embodiment determines the amount Qa of oxidizing gas supply to the selective CO oxidizing unit 34, based on the data regarding the concentration of carbon monoxide output from the carbon monoxide sensor 212. Another parameter may, however, be used for determination of the amount Qa of oxidizing gas supply. The available parameter is, for example, data regarding the battery output from the stack of fuel cells 20. When a decrease in battery output from the stack of fuel cells 20 is detected, this modified structure ascribes the decrease in battery output to CO poisoning of the catalyst on the anodes in the stack of fuel cells 20, and controls the amount Qa of oxidizing gas supply to the selective CO oxidizing unit 34 in order to restore the battery output.

Figure 14:
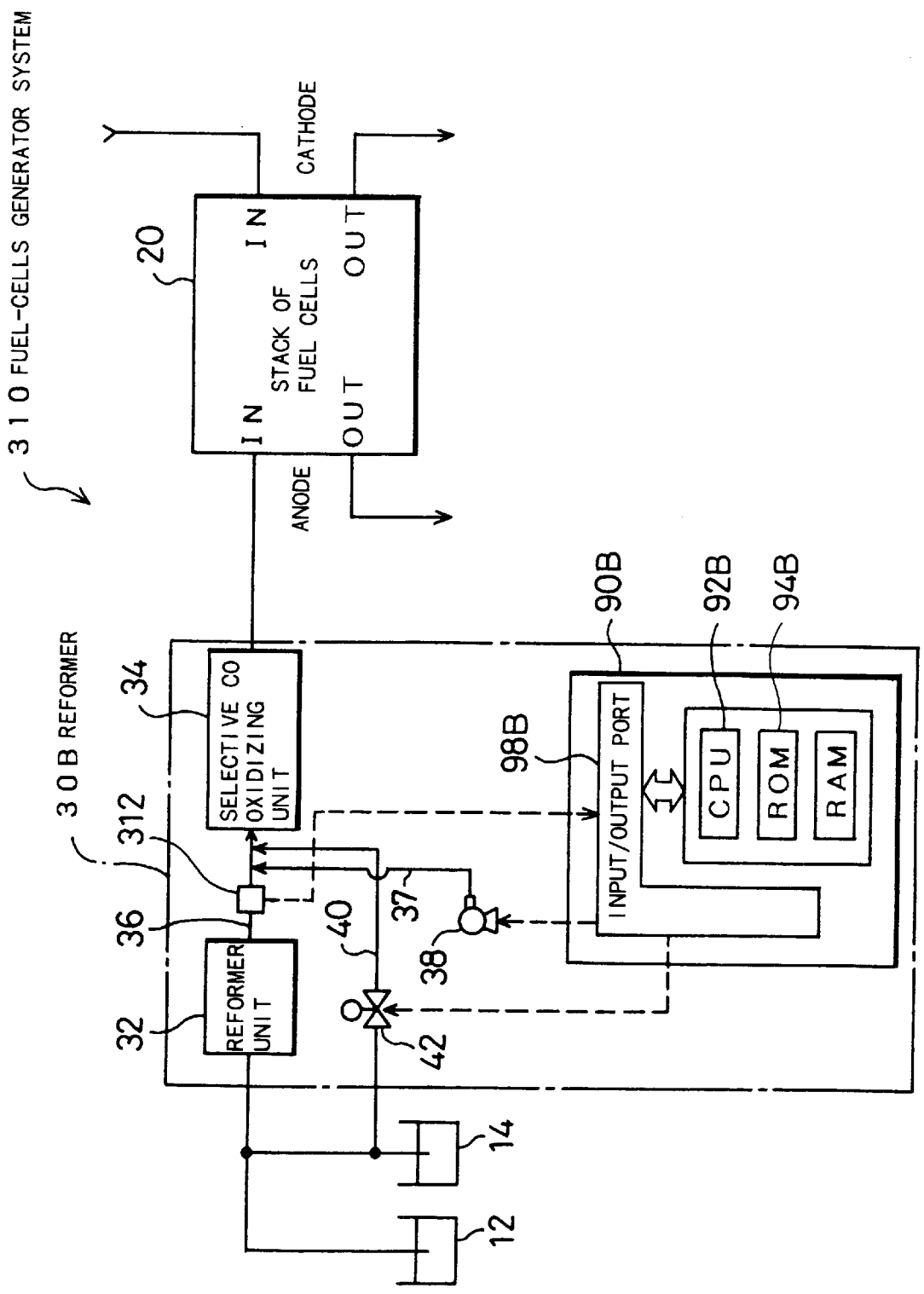
FIG. 14 is a block diagram schematically illustrating structure of another fuel-cells generator system 310 as a third embodiment according to the present invention.

The following describes still another fuel-cells generator system 310 as a third embodiment according to the present invention. FIG. 14 is a block diagram schematically illustrating structure of the fuel-cells generator system 310 of the third embodiment. The fuel-cells generator system 310 of the third embodiment has a similar hardware structure to that of the fuel-cells generator system 10 of the first embodiment, except that the temperature sensor 52 is not set in the selective CO oxidizing unit 34 and that the third embodiment has a gas flow meter 312 for measuring the flow rate of the reformed gas output from the reformer unit 32 of a reformer 30B. The same constituents are shown by like numerals and not specifically described here.

The gas flow meter 312 is disposed in the middle of the connection pipe 36 that connects the reformer unit 32 to the selective CO oxidizing unit 34 in the reformer 30B, and more particularly arranged up the joint of the induction pipe 37 of the oxidizing gas with the connection pipe 36. The gas flow meter 312 for measuring the flow rate of the reformed gas output from the reformer unit 32 is electrically connected with an input/output port 98B of an electronic control unit 90B.

Figure 15:
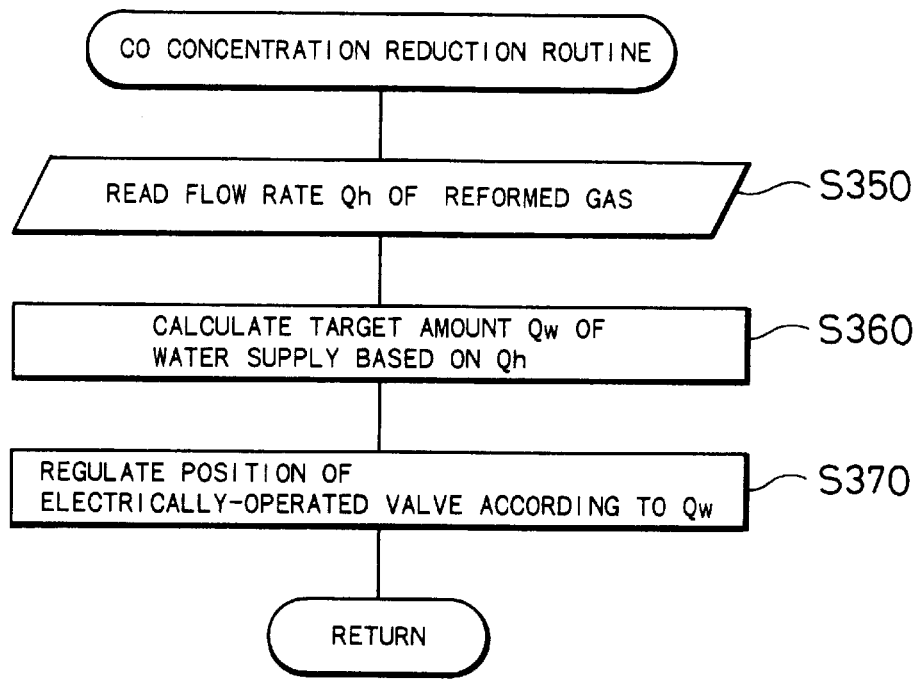
FIG. 15 is a flowchart showing a CO concentration reduction routine executed by the electronic control unit 90B of the third embodiment.

The electronic control unit 90B of the fuel-cells generator system 310 carries out a control operation for decreasing the concentration of carbon monoxide included in the gaseous fuel, which is different from that carried out in the first embodiment but is based on a routine of reducing CO concentration shown in the flowchart of FIG. 15. The routine of FIG. 15 is repeatedly carried out at predetermined time intervals, for example, at every 100 msec, after the reformer 30B has been driven and reached a stationary state.

Figure 16:
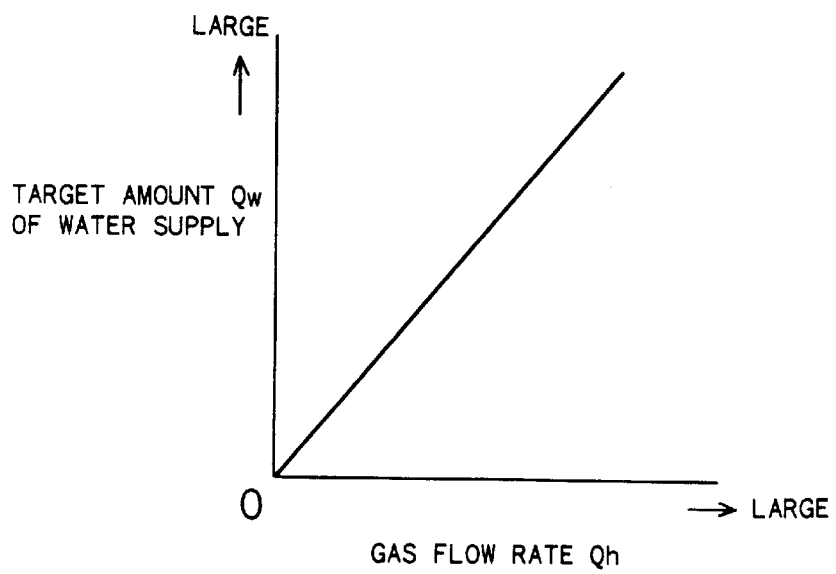
FIG. 16 is a graph showing the relationship between the flow rate Qh of the reformed gas and the target amount Qw of water supply.

When the program enters the routine of FIG. 15, a CPU 92B of the electronic control unit 90B first reads a flow rate Qh of the reformed gas at the outlet of the reformer unit 32 measured by the gas flow meter 312 via the input/output port 98B at step S350. The CPU 92B then determines a target amount Qw of water supply into the selective CO oxidizing unit 34 based on the flow rate Qh of the reformed gas at step S360. In accordance with a concrete procedure, the CPU 92B reads the target amount Qw of water supply corresponding to the observed flow rate Qh of the reformed gas from a map, which represents the relationship of FIG. 16 and is stored in advance in a ROM 94B of the electronic control unit 90B. The CPU 92B subsequently regulates the position of the electrically-operated valve 42 based on the target amount Qw of water supply, thereby enabling water of the target amount Qw to be flown through the water inlet pipe 40 and introduced into the selective CO oxidizing unit 34 at step S370. After the execution of step S370, the program exits from this control routine.

As discussed above, the CO concentration reduction routine of the third embodiment enables water of the predetermined amount according to the observed flow rate Qh of the reformed gas at the outlet of the reformer unit 32 to be introduced into the selective CO oxidizing unit 34.

The heat release value in the selective CO oxidizing unit 34 is affected by the amount of carbon monoxide included in the reformed gas fed to the selective CO oxidizing unit 34. In case that the reformer unit 32 is driven in a constant state, the amount of carbon monoxide included in the reformed gas is varied in proportion to the total amount of the reformed gas. Namely the increase in flow rate Qh of the reformed gas increases the heat release value in the selective CO oxidizing unit 34. Regulation of the amount Qw of water supply to the selective CO oxidizing unit 34 based on the observed flow rate Qh of the reformed gas thus controls the degree of cooling the selective CO oxidizing unit 34 in response to the heat release value in the selective CO oxidizing unit 34. This structure enables the operating temperature of the selective CO oxidizing unit 34 to be kept within the desired temperature range.

Figure 17:
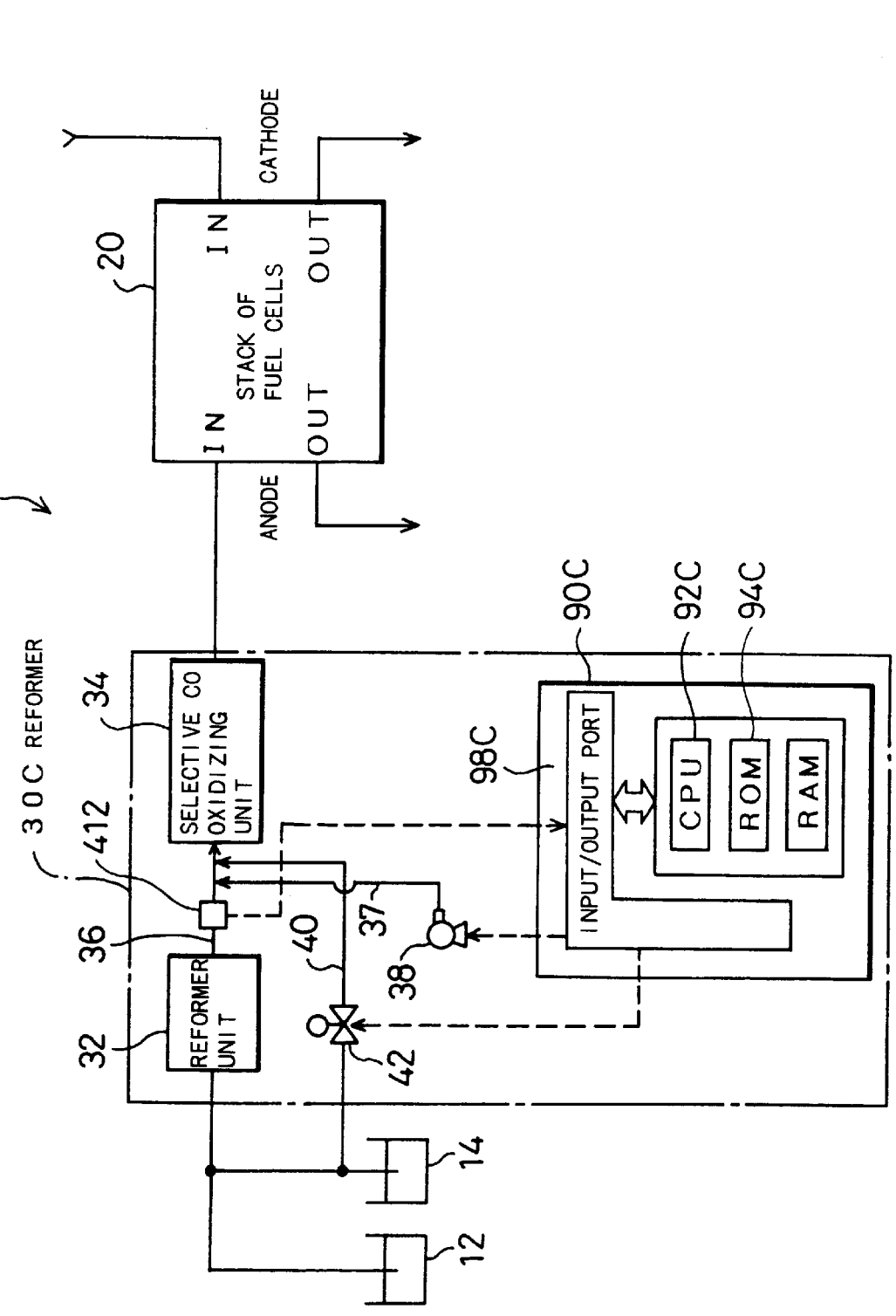
FIG. 17 is a block diagram schematically illustrating structure of another fuel-cells generator system 410 as a fourth embodiment according to the present invention.

The following describes still another fuel-cells generator system 410 as a fourth embodiment according to the present invention. FIG. 17 is a block diagram schematically illustrating structure of the fuel-cells generator system 410 of the fourth embodiment. The fuel-cells generator system 410 of the fourth embodiment has a similar hardware structure to that of the fuel-cells generator system 310 of the third embodiment, except that the gas flow meter 312 is replaced by a carbon monoxide sensor 412 for measuring the concentration of carbon monoxide included in the reformed gas output from the reformer unit 32. The same constituents are shown by like numerals and not specifically described here.

The carbon monoxide sensor 412 is identical with the carbon monoxide sensor 212 used in the second embodiment, and is disposed in the middle of the connection pipe 36 that connects the reformer unit 32 to the selective CO oxidizing unit 34 in a reformer 30C and more particularly arranged up the joint of the induction pipe 37 of the oxidizing gas with the connection pipe 36. The carbon monoxide sensor 412 is electrically connected to an input/output port 98C of an electronic control unit 90C.

Figure 18:
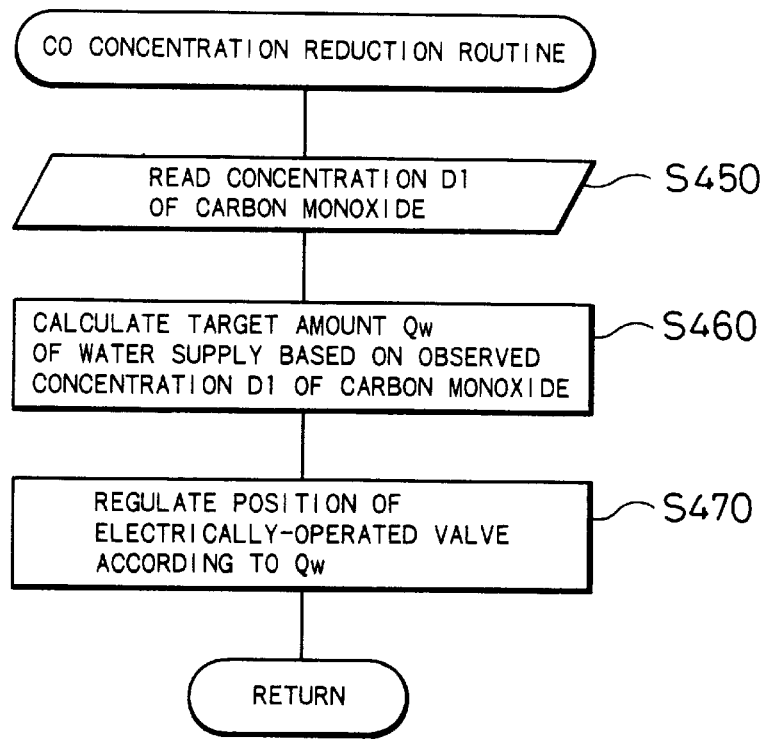
FIG. 18 is a flowchart showing a CO concentration reduction routine executed by the electronic control unit 90C of the fourth embodiment.

The electronic control unit 90C of the fuel-cells generator system 410 carries out a control operation for decreasing the concentration of carbon monoxide included in the gaseous fuel, based on a routine of reducing CO concentration shown in the flowchart of FIG. 18. The routine of FIG. 18 is repeatedly carried out at predetermined time intervals, for example, at every 100 msec, after the reformer 30C has been driven and reached a stationary state.

Figure 19:
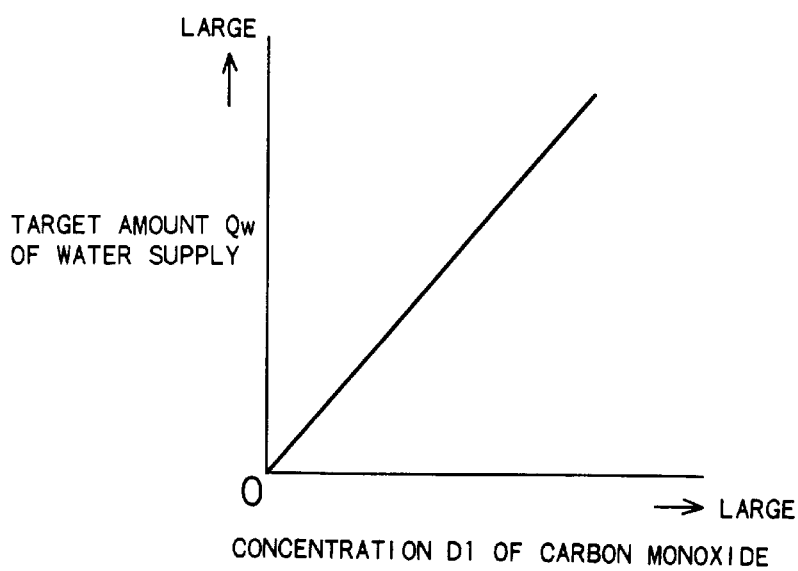
FIG. 19 is a graph showing the relationship between the concentration D1 of carbon monoxide and the target amount Qw of water supply.

When the program enters the routine of FIG. 18, a CPU 92C of the electronic control unit 90C first reads a concentration D1 of carbon monoxide included in the reformed gas at the outlet of the reformer unit 32 measured by the carbon monoxide sensor 412 via the input/output port 98C at step S450. The CPU 92C then determines a target amount Qw of water supply to the selective CO oxidizing unit 34 based on the observed concentration D1 of carbon monoxide at step S460. In accordance with a concrete procedure, the CPU 92C reads the target amount Qw of water supply corresponding to the observed concentration D1 of carbon monoxide from a map, which represents the relationship of FIG. 19 and is stored in advance in a ROM 94C of the electronic control unit 90C. The CPU 92C subsequently regulates the position of the electrically-operated valve 42 based on the target amount Qw of water supply, thereby enabling water of the target amount Qw to be flown through the water inlet pipe 40 and introduced into the selective CO oxidizing unit 34 at step S470. After the execution of step S470, the program exits from this control routine.

Like the first and the second embodiments, in the selective CO oxidizing unit 34 of the fuel-cells generator system 410 of the fourth embodiment, the amount of oxidizing gas supply is regulated according to the concentration of carbon monoxide. While the second embodiment utilizes the concentration D of carbon monoxide at the outlet of the selective CO oxidizing unit 34 measured by the carbon monoxide sensor 212, the fourth embodiment utilizes the concentration D1 of carbon monoxide at the inlet of the selective CO oxidizing unit 34 measured by the carbon monoxide sensor 412.

As discussed above, the CO concentration reduction routine of the fourth embodiment regulates the amount Qw of water supply flowing through the water inlet pipe 40 based on the observed concentration D1 of carbon monoxide included in the reformed gas output from the reformer unit 32. The amount of oxidizing gas supply flowing through the induction pipe 37 is also regulated according to the observed concentration D1 of carbon monoxide.

The progress of the oxidative reaction in the selective CO oxidizing unit 34 is affected by the concentration D1 of carbon monoxide included in the reformed gas fed to the selective CO oxidizing unit 34. Regulation of the amount of water supply to the selective CO oxidizing unit 34 based on the observed concentration D1 of carbon monoxide in the reformed gas thus controls the degree of cooling the selective CO oxidizing unit 34 in response to the progress of the oxidative reaction. The amount of oxidizing gas supply is also regulated according to the observed concentration D1 of carbon monoxide in this embodiment, so that a sufficient amount of the oxidizing gas required for the oxidative reaction is fed to the selective CO oxidizing unit 34. This results in a large heat release value in the selective CO oxidizing unit 34 under the condition of a high concentration D1 of carbon monoxide. The structure of the fourth embodiment, however, controls the degree of cooling the selective CO oxidizing unit 34 according to the observed concentration D1 of carbon monoxide, thereby enabling the operating temperature of the selective CO oxidizing unit 34 to be kept within the desired temperature range.

Figure 20:
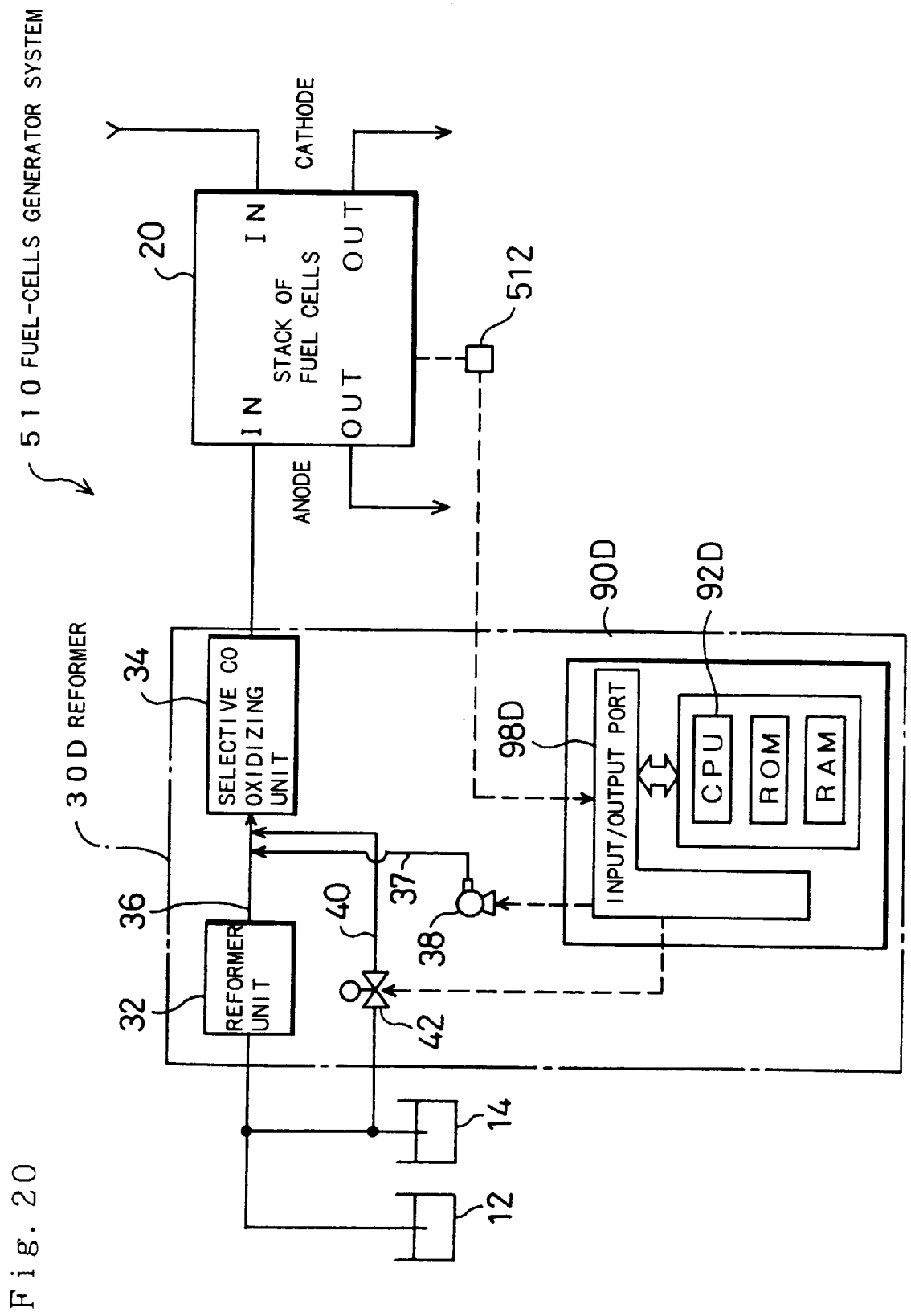
FIG. 20 is a block diagram schematically illustrating structure of another fuel-cells generator system 510 as a fifth embodiment according to the present invention.

The following describes still another fuel-cells generator system 510 as a fifth embodiment according to the present invention. FIG. 20 is a block diagram schematically illustrating structure of the fuel-cells generator system 510 of the fifth embodiment. The fuel-cells generator system 510 of the fifth embodiment has an impedance meter 512 for measuring the impedance of the stack of fuel cells 20, in addition to all the constituents of the fuel-cells generator system 10 of the first embodiment except the temperature sensor 52. The same constituents are shown by like numerals and not specifically described here.

The impedance meter 512 is disposed between the anode 22 and the cathode 23 of a predetermined unit cell in the stack of fuel cells 20. The impedance meter 512 applies an a.c. signal between the anode 22 and the cathode 23 and detects an a.c. resistance, that is, an impedance, from an observed electric current in the case of application of a constant voltage and from an observed voltage in the case of supply of a constant current. The available a.c. signal is generally in the range of 100 Hz to 10 kHz. The impedance meter 512 is electrically connected to an input/output port 98D of an electronic control unit 90D.

The electronic control unit 90D of the fuel-cells generator system 510 carries out the CO concentration reduction control of the first embodiment shown in the flowchart of FIG. 5 as well as a control operation for moistening the stack of fuel cells 20. The moistening control is based on a moistening control routine shown in the flowchart of FIG. 21. The moistening control routine is repeatedly carried out at predetermined time intervals, for example, at every 100 msec, independently of the CO concentration reduction routine, after a reformer 30D has been driven and reached a stationary state.

Figure 21:
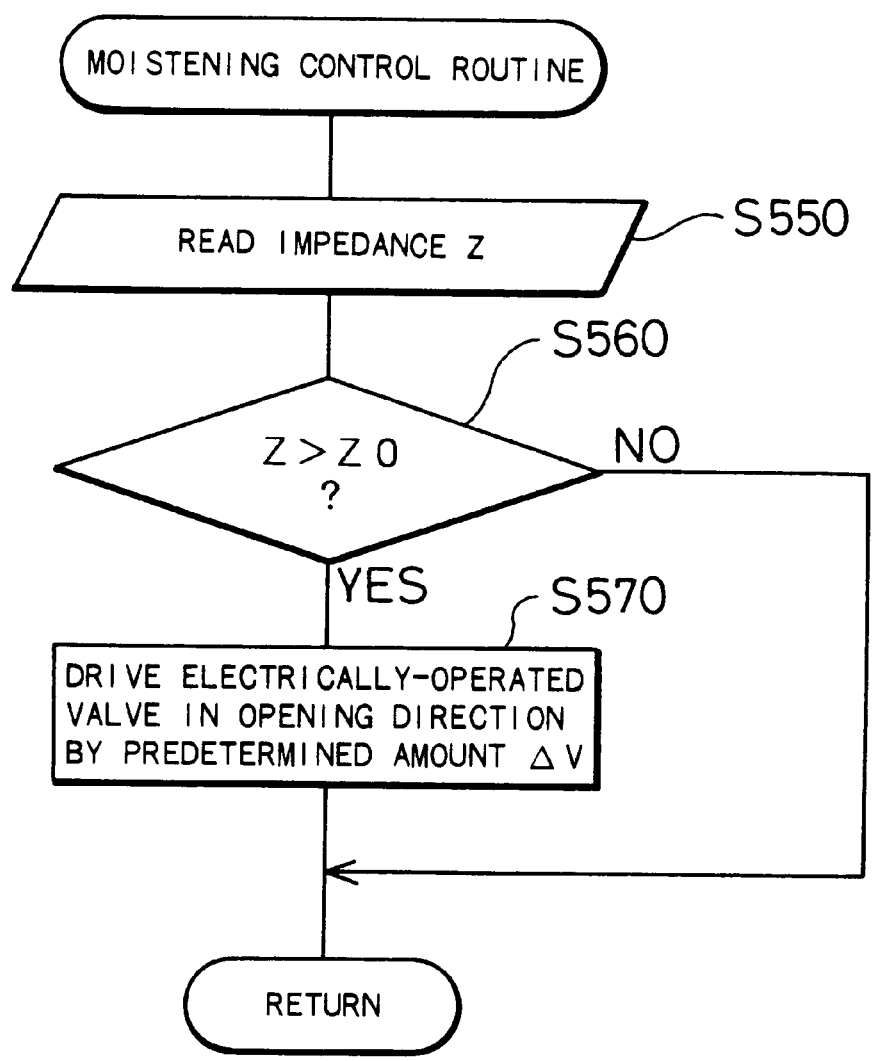
FIG. 21 is a flowchart showing a moistening control routine executed by the electronic control unit 90D of the fifth embodiment.

When the program enters the routine of FIG. 21, a CPU 92D of the electronic control unit 90D first reads an impedance Z measured by the impedance meter 512 via the input/output port 98D at step S550. The observed impedance Z is then compared with a predetermined value Z0 at step S560.

Under certain driving conditions, the stack of fuel cells 20 fall into a state in which the electrolyte membranes 21 are partly too wet or a state in which the electrolyte membranes 21 are partly too dried. These states can be detected by the impedance Z between the anode 22 and the cathode 23. In case that the observed impedance Z exceeds the predetermined value Z0 at step S560, the program determines that the electrolyte membranes 21 are too dried in the stack of fuel cells 20 and proceeds to step S570 to regulate the position V of the electrically-operated valve 42 disposed in the water inlet pipe 40 in the opening direction by a predetermined amount $\Delta V$. This operation increases the amount of water supplied through the water inlet pipe 40 to the selective CO oxidizing unit 34, thereby increasing the water vapor included in the gaseous fuel output from the selective CO oxidizing unit 34. This results in moistening the stack of fuel cells 20 and decreasing the impedance Z.

After the execution of step S570, the program exits from this control routine. In case that the observed impedance Z is not greater than the predetermined value Z0 at step S560, on the other hand, the program immediately exits from this routine.

As discussed above, the fuel-cells generator system 510 of the fifth embodiment determines whether or not the electrolyte membranes 21 are too dried in the stack of fuel cells 20, based on the impedance between the anode 22 and the cathode 23 measured by the impedance meter 512. When it is determined that the electrolyte membranes 21 are too dried, the structure of the fifth embodiment increases the amount of water supplied through the water inlet pipe 40 to the selective CO oxidizing unit 34, thereby increasing the amount of water vapor included in the gaseous fuel fed from the selective CO oxidizing unit 34 to the stack of fuel cells 20. This operation enables the water content of the electrolyte membranes 21 in the stack of fuel cells 20 to be maintained within a predetermined range. This accordingly prevents the electrolyte membranes 21 in the stack of fuel cells 20 from being too dried or too wet, thus ensuring stable high outputs from the stack of fuel cells 20.

In the fifth embodiment, the impedance meter 512 measures the impedance between the anode 22 and the cathode 23 of a predetermined unit cell in the stack of fuel cells 20. Another possible structure may, however, measure the impedance for all the unit cells constituting the stack of fuel cells 20 and calculate a mean impedance or sum up all the observed impedances. The structural characteristic of the stack of fuel cells 20 teaches, for example, that the unit cells close to the end plates tend to be too wet or too dried. The impedance may accordingly be measured for these specific cells.

The structure of measuring the impedance may be replaced by the structure of measuring a d.c. resistance between electrodes of a predetermined unit cell in the stack of fuel cells 20. Since the fuel cells generate a d.c. electromotive force during operation, it is generally impossible to measure the d.c. resistance directly. There is, however, an available method of directly measuring the d.c. resistance. This method cuts off a loading connected to the stack of fuel cells 20 for a very short time period, for example, several milliseconds, measures the d.c. resistance in the cut-off state, and again connects the loading to the stack of fuel cells 20. The available method then calculates the water content of the electrolyte membrane 21 in the stack of fuel cells 20 from the observed d.c. resistance and regulates the amount of water supply to the selective CO oxidizing unit 34 based on the result of calculation.

Figure 22:
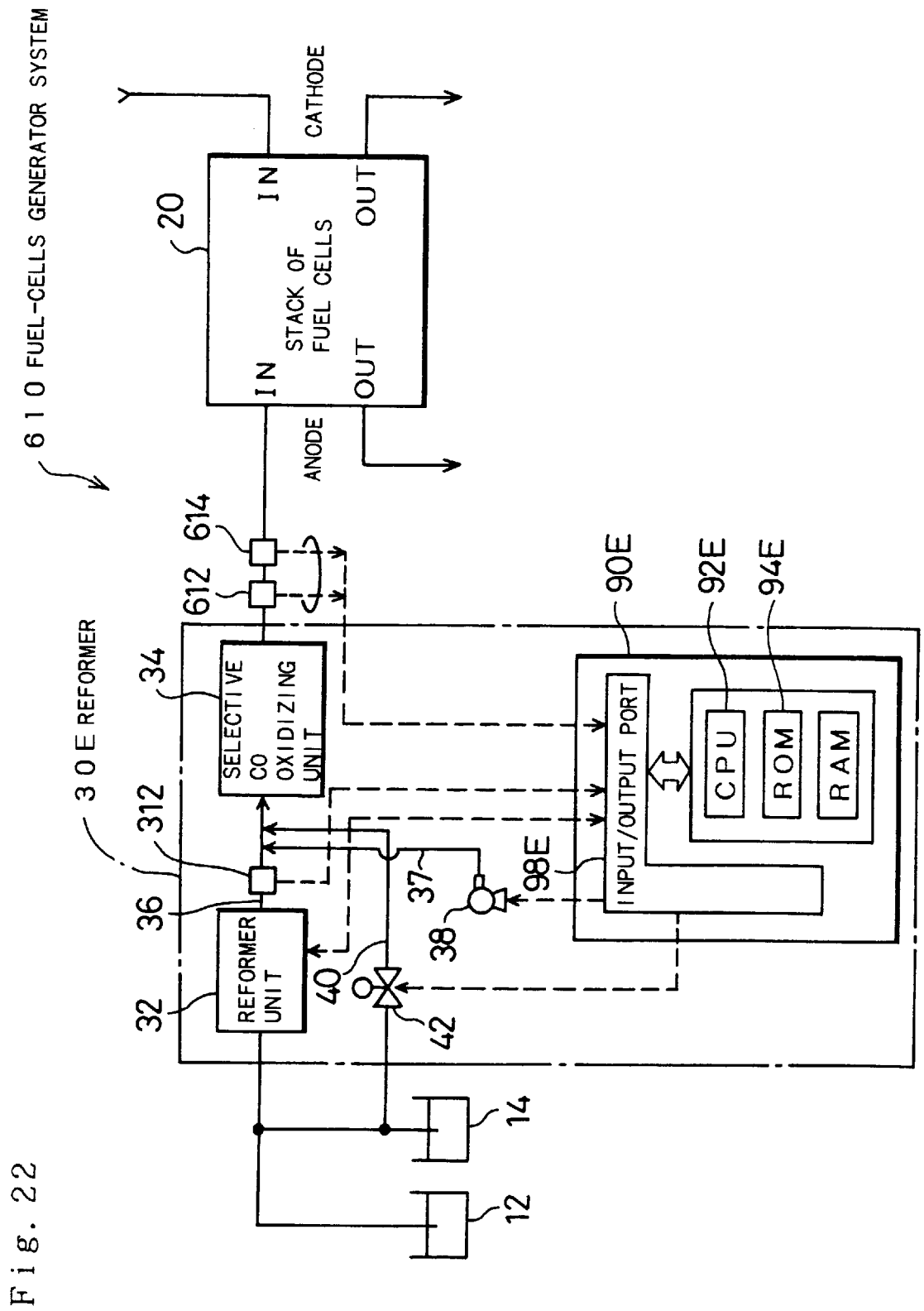
FIG. 22 is a block diagram schematically illustrating structure of still another fuel-cells generator system 610 as a sixth embodiment according to the present invention.

The following describes still another fuel-cells generator system 610 as a sixth embodiment according to the present invention. FIG. 22 is a block diagram schematically illustrating structure of the fuel-cells generator system 610 of the sixth embodiment. The fuel-cells generator system 610 of the sixth embodiment has a flow sensor 612 for measuring a flow rate Q of the gaseous fuel fed to the stack of fuel cells 20 and a pressure sensor 614 for measuring a pressure P of the gaseous fuel, in addition to all the constituents of the fuel-cells generator system 310 of the third embodiment. The same constituents are shown by like numerals and not specifically described here.

The flow sensor 612 and the pressure sensor 614 are respectively disposed in the middle of a flow path that connects a reformer 30E with the stack of fuel cells 20 and measure the flow rate Q and the pressure P of the gaseous fuel supplied to the stack of fuel cells 20. Both the flow sensor 612 and the pressure sensor 614 are electrically connected to an input/output port 98E of an electronic control unit 90E.

The electronic control unit 90E of the fuel-cells generator system 610 carries out a CO concentration reduction control, which is similar to that executed in the third embodiment, as well as a process of determining a maximum amount of water supply to the selective CO oxidizing unit 34. This determination is based on a maximum water supply calculation routine shown in the flowchart of FIG. 23. The routine of FIG. 23 is repeatedly carried out at predetermined time intervals, for example, at every 100 msec, independently of the CO concentration reduction routine, after the reformer 30E has been driven and reached a stationary state.

Figure 23:
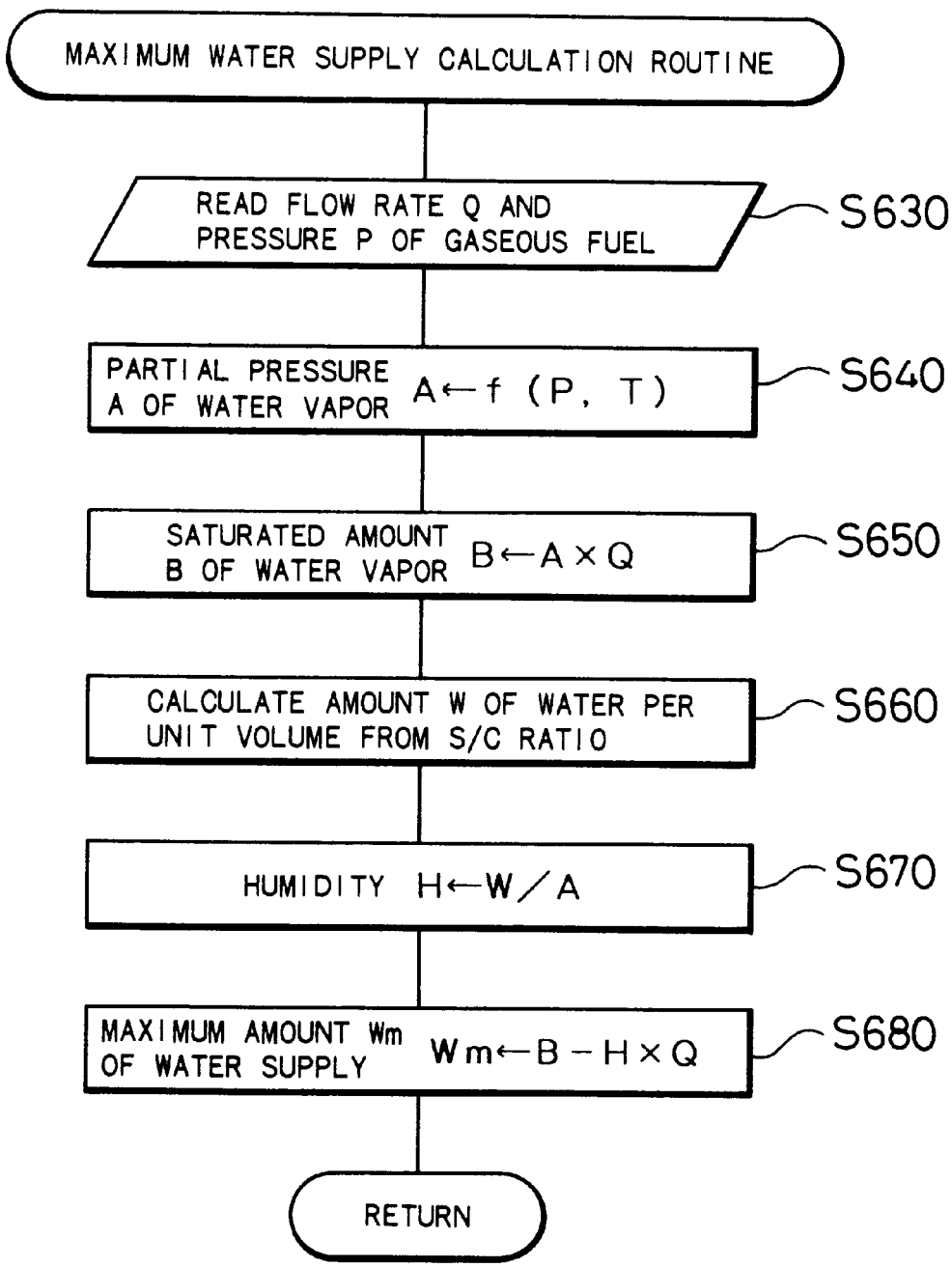
FIG. 23 is a flowchart showing a maximum water supply calculation routine executed by the electronic control unit 90E of the sixth embodiment.

When the program enters the routine of FIG. 23, a CPU 92E of the electronic control unit 90E first reads the flow rate Q and the pressure P of the gaseous fuel measured by the flow sensor 612 and the pressure sensor 614 via the input/output port 98E at step S630. The CPU 92E then determines a partial pressure A of water vapor in the gaseous fuel flown into the stack of fuel cells 20 based on the input pressure P of the gaseous fuel and an operating temperature T of the stack of fuel cells 20 at step S640. Although not being discussed specifically, the stack of fuel cells 20 is controlled to keep a substantially constant operating temperature T, for example, 80° C. in polymer electrolyte fuel cells. This value 80° C. is used for the determination at step S640. In accordance with a concrete procedure, at step S640, the CPU 92E reads the partial pressure A of water vapor corresponding to the gas pressure P and the operating temperature T from a map that has been stored previously in a ROM 94E. At subsequently step S650, the CPU 92E calculates a saturated amount B of water vapor in the gaseous fuel flown into the stack of fuel cells 20 by multiplying the partial pressure A of water vapor by the gas flow rate Q read at step S630.

The CPU 92E then calculates a ratio of the hydrocarbon to water (water vapor) (hereinafter referred to as the S/C ratio) subjected to the reforming reaction in the reformer unit 32 based on the regulation of supplies of methanol and water to the reformer unit 32 according to another control routine, and calculates an amount W of water per unit volume from the S/C ratio at step S660. The program then proceeds to step S670 to calculate a humidity H by dividing the amount W of water calculated at step S660 by the partial pressure A of water vapor obtained at step S640. The CPU 92E finally subtracts the product of the humidity H calculated at step S670 and the gas flow rate Q read at step S630 from the saturated amount B of water vapor obtained at step S650, thereby determining a maximum amount Wm of water supply at step S680. After the execution of step S680, the program exits from this routine.

The maximum amount Wm of water supply thus obtained enables the water content included in the gaseous fuel fed from the reformer 30E to the stack of fuel cells 20 to be saturated at the pressure P of the gaseous fuel and the operating temperature T of the fuel cells, that is, the water supply attaining the humidity of 100%.

Figure 24:
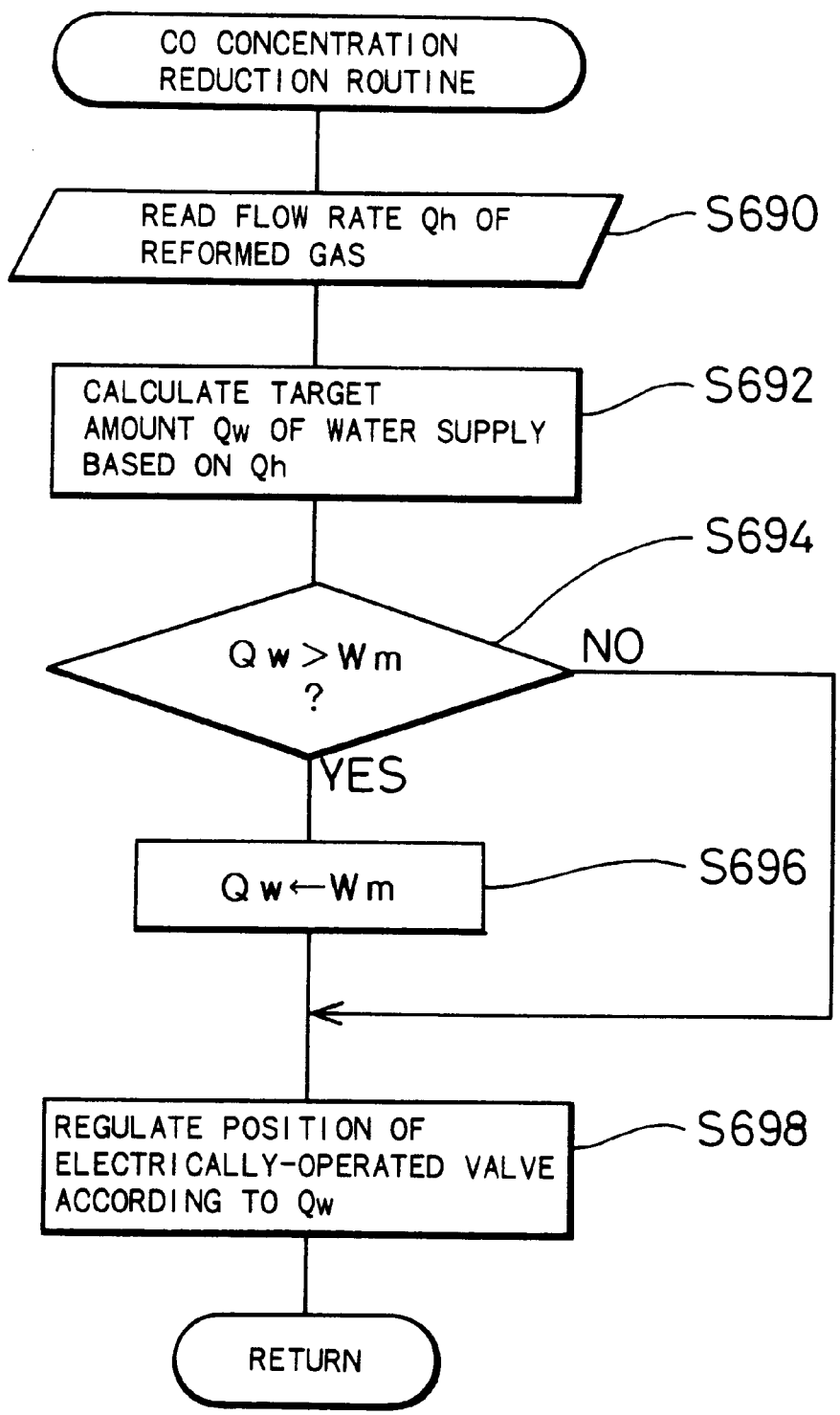
FIG. 24 is a flowchart showing a CO concentration reduction routine executed by the electronic control unit 90E of the sixth embodiment.

The electronic control unit 90E also carries out a control operation for decreasing the concentration of carbon monoxide based on a CO concentration reduction routine shown in the flowchart of FIG. 24. Like the CO concentration reduction routine of the third embodiment shown in the flowchart of FIG. 15, this routine is repeatedly executed at predetermined time intervals, for example, at every 100 msec.

When the program enters the routine of FIG. 24, the CPU 92E of the electronic control unit 90E first carries out the processing of steps S690 and S692, which are identical with steps S350 and S360 in the CO concentration reduction routine of the third embodiment, in order to determine the target amount Qw of water supply based on the flow rate Qh of the reformed gas. The target amount Qw of water supply is then compared with the maximum amount Wm of water supply obtained in the maximum water supply calculation routine discussed above at step S694. In case that the target amount Qw of water supply exceeds the maximum amount Wm of water supply, the target amount Qw of water supply is restricted to the maximum amount Wm of water supply at step S696. In case that the target amount Qw of water supply does not exceed the maximum amount Wm of water supply at step S694, on the other hand, the program skips the processing of step S696 and keeps the target amount Qw of water supply calculated at step S692 unchanged.

The program then proceeds to step S698, which is identical with step S370 in the CO concentration reduction routine of the third embodiment, to regulate the position of the electrically-operated valve 42 based on the target amount Qw of water supply. After the execution of step S698, the program exits from this routine.

As discussed above, the CO concentration reduction routine of the sixth embodiment prevents the target amount Qw of water supply fed to the selective CO oxidizing unit 34 from exceeding the maximum amount Wm of water supply, thereby preventing the water content in the gaseous fuel from being supersaturated at the pressure P of the gaseous fuel and the operating temperature T of the fuel cells.

In the fuel-cells generator system 610 of the sixth embodiment, the gaseous fuel output from the reformer 30E is not flown into the stack of fuel cells 20 under the supersaturated condition. This structure effectively prevents the supersaturated water vapor in the gaseous fuel from aggregating to liquid water in the stack of fuel cells 20 and accordingly blocking the flow paths 24p of gaseous fuel in the fuel cells. This feature enables the stack of fuel cells 20 to be stably and continuously driven at high battery outputs.

The fuel-cells generator system 610 of the sixth embodiment adds the restriction by the maximum amount Wm of water supply to the fuel-cells generator system 310 of the third embodiment. The restriction by the maximum amount Wm of water supply may, however, be added to the fuel-cells generator systems of the other embodiments (that is, the first, the second, the fourth, and the fifth embodiments). In the second, the fourth, and the fifth embodiments, the processing of steps S694 and S696 discussed above is carried out. Namely when the target amount Qw of water supply obtained in the CO concentration reduction routine exceeds the maximum amount Wm of water supply, the target amount Qw of water supply is restricted to the maximum amount Wm of water supply. In the first embodiment, on the other hand, at step S140 in the CO concentration reduction routine, the position of the electrically-operated valve 42 is regulated to a specific value that restricts the actual amount of water supply to the maximum amount Wm of water supply.

Like the sixth embodiment, these structures prevent the gaseous fuel output from the reformer from being flown into the stack of fuel cells 20 under the supersaturated condition. This effectively prevents the supersaturated water vapor in the gaseous fuel from aggregating to liquid water in the stack of fuel cells 20 and accordingly blocking the flow paths 24p of gaseous fuel in the fuel cells.

Figure 25:
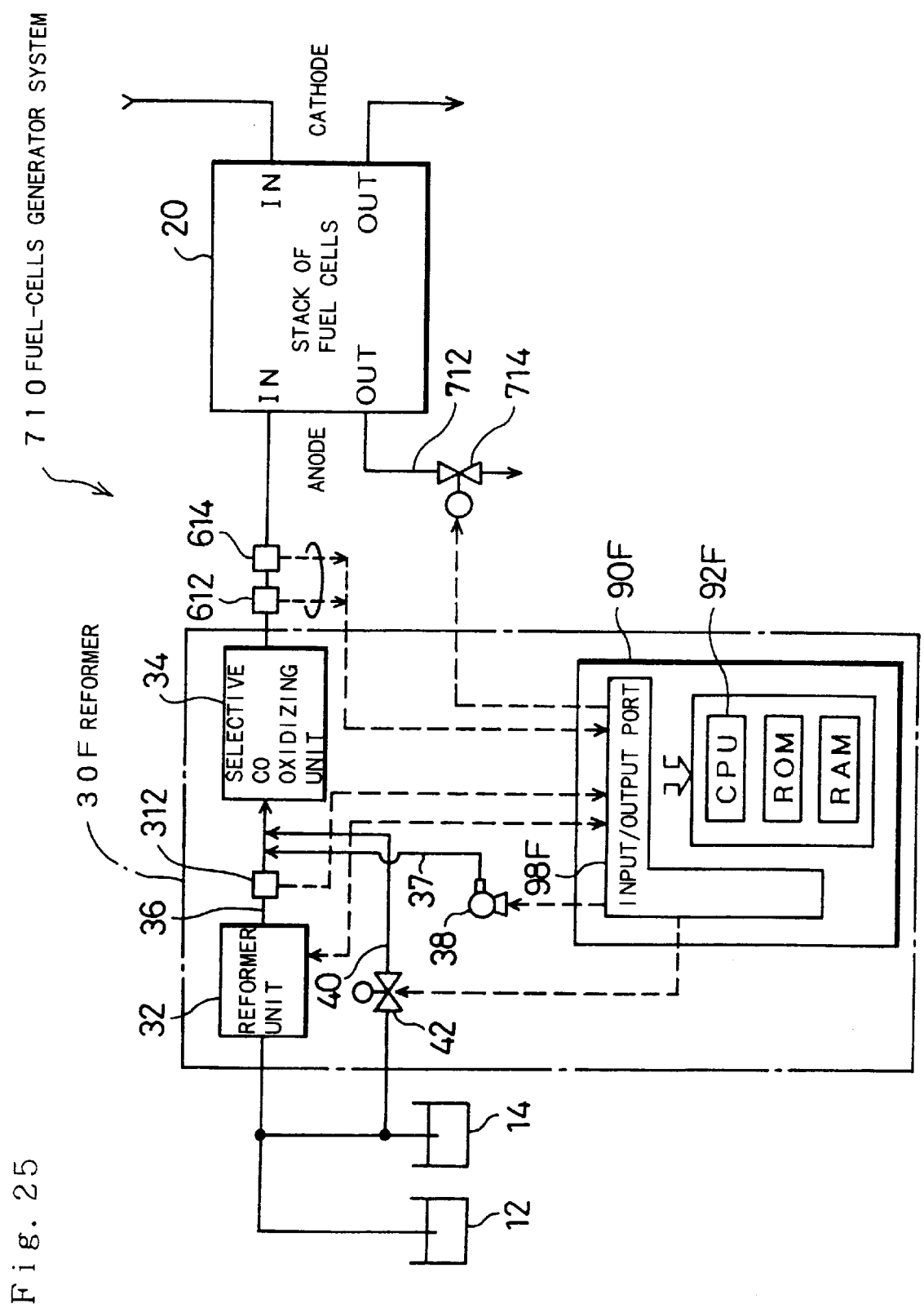
FIG. 25 is a block diagram schematically illustrating structure of another fuel-cells generator system 710 as a seventh embodiment according to the present invention.

The following describes another fuel-cells generator system 710 as a seventh embodiment according to the present invention. FIG. 25 is a block diagram schematically illustrating structure of the fuel-cells generator system 710 of the seventh embodiment. The fuel-cells generator system 710 of the seventh embodiment has a back-pressure regulating valve 714 for regulating an opening of a gaseous fuel discharge conduit 712 that discharges the gaseous fuel from the stack of fuel cells 20 to the outside, in addition to all the constituents of the fuel-cells generator system 610 of the sixth embodiment. The same constituents are shown by like numerals and not specifically described here.

The back-pressure regulating valve 714 is electrically connected to an input/output port 98F of an electronic control unit 90F. The position of the back-pressure regulating valve 714 is regulated by control signals output from the electronic control unit 90F.

The electronic control unit 90F of the fuel-cells generator system 710 carries out a control operation for regulating the pressure of the gaseous fuel, as well as the maximum water supply calculation routine of the sixth embodiment shown in the flowchart of FIG. 23 and the CO concentration reduction routine of the third embodiment shown in the flowchart of FIG. 15. Regulation of the pressure of the gaseous fuel is based on a fuel gas pressure control routine shown in the flowchart of FIG. 26. This routine is repeatedly carried out at predetermined time intervals, for example, at every 100 msec, independently of the CO concentration reduction routine and the maximum water supply calculation routine, after a reformer 30F has been driven and reached a stationary state.

Figure 26:
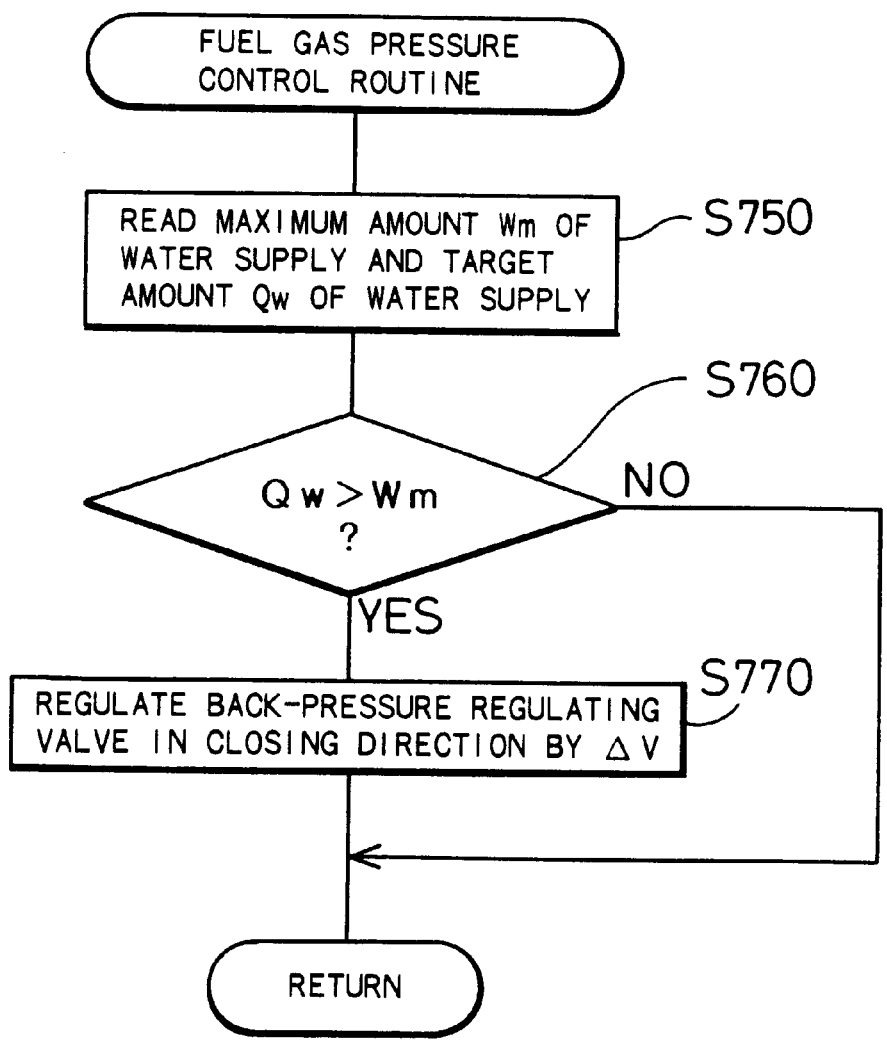
FIG. 26 is a flowchart showing a fuel gas pressure control routine executed by the electronic control unit 90F of the seventh embodiment.

When the program enters the routine of FIG. 26, a CPU 92F of the electronic control unit 90F first reads the maximum amount Wm of water supply obtained in the maximum water supply calculation routine discussed in the sixth embodiment and the target amount Qw of water supply obtained in the CO concentration reduction routine discussed in the third embodiment at step S750. The target amount Qw of water supply is then compared with the maximum amount Wm of water supply at step S760. When the target amount Qw of water supply exceeds the maximum amount Wm of water supply, the program proceeds to step S770 to drive the back-pressure regulating valve 714 in the closing direction by a predetermined small amount $\Delta V$, thereby increasing the gas pressure P in the gaseous fuel discharge conduit 712. After the execution of step S770, the program exits from this routine.

When it is determined that the target amount Qw of water supply does not exceed the maximum amount Wm of water supply at step S760, on the contrary, the program skips the processing of step S770 and exits from this routine.

As discussed above, when the target amount Qw of water supply fed to the selective CO oxidizing unit 34 exceeds the maximum amount Wm of water supply, the fuel gas pressure control routine drives the back-pressure regulating valve 714 in the closing direction, so as to gradually enhance the gas pressure P in the gaseous fuel discharge conduit 712. The increase in pressure P of the gaseous fuel increases the saturated amount of water vapor in the gaseous fuel. This structure accordingly prevents the gaseous fuel from being flown into the fuel cells under the supersaturated condition, without changing the target amount Qw of water supply calculated in the CO concentration reduction routine.

Like the sixth embodiment, the fuel-cells generator system 710 of the seventh embodiment effectively prevents the supersaturated water vapor in the gaseous fuel from aggregating to liquid water in the stack of fuel cells 20 and accordingly blocking the flow paths 24p of gaseous fuel in the fuel cells. This feature enables the stack of fuel cells 20 to be stably and continuously driven at high battery outputs. The structure of the seventh embodiment enables water of the target amount Qw calculated in the CO concentration reduction routine to be fed into the selective CO oxidizing unit 34. Namely water of greater than a required amount can be fed into the selective CO oxidizing unit 34.

Like the fuel-cells generator system 610 of the sixth embodiment, the additional structure of the seventh embodiment is applied to the fuel-cells generator system 310 of the third embodiment. This additional structure may, however, be applied to the other embodiments (that is, the first, the second, the fourth, and the fifth embodiments).

Figure 27:
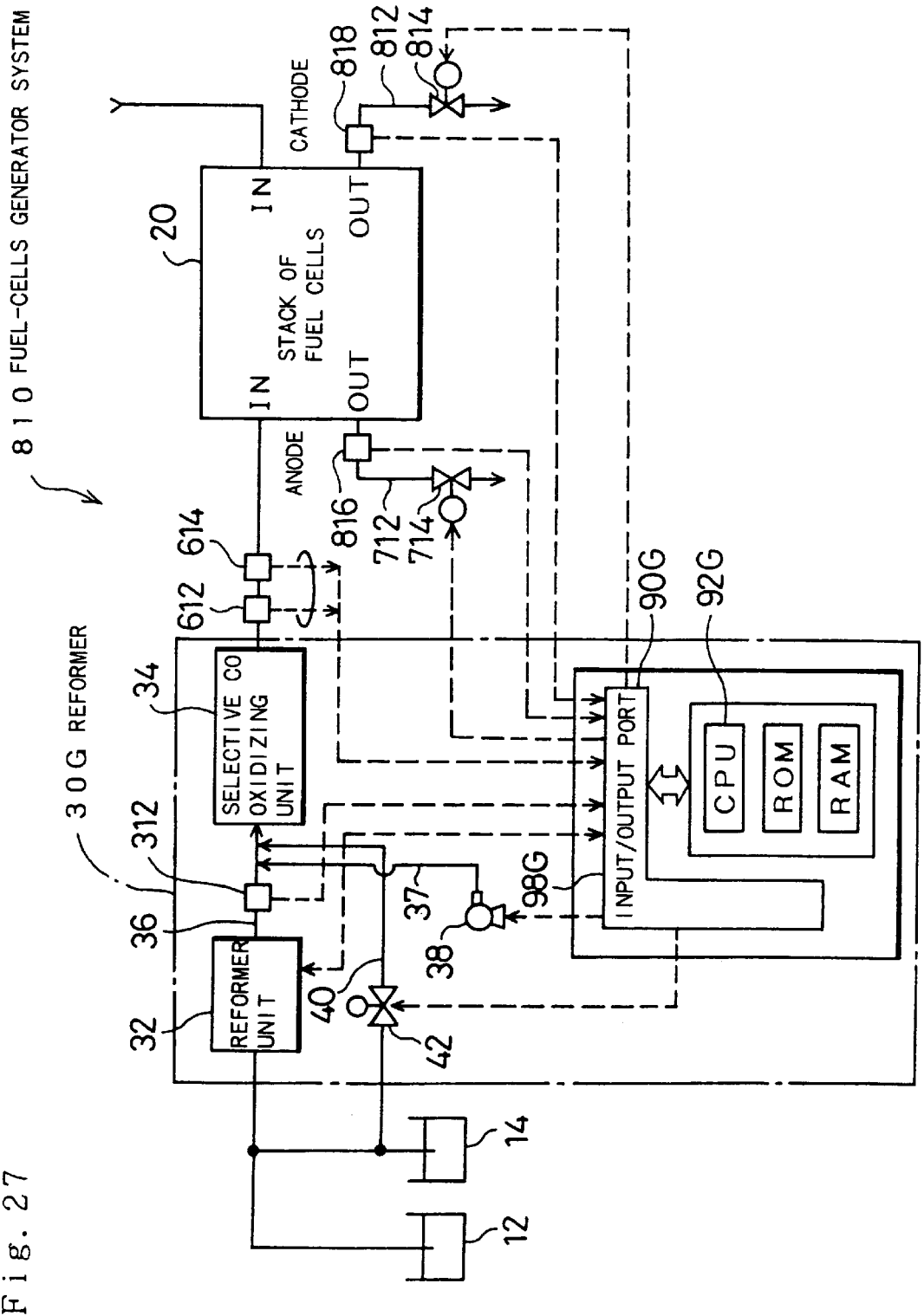
FIG. 27 is a block diagram schematically illustrating structure of still another fuel-cells generator system 810 as an eighth embodiment according to the present invention.

The following describes still another fuel-cells generator system 810 as an eighth embodiment according to the present invention. FIG. 27 is a block diagram schematically illustrating structure of the fuel-cells generator system 810 of the eighth embodiment. The fuel-cells generator system 810 of the eighth embodiment has a back-pressure regulating valve 814 for regulating an opening of an oxidizing gas discharge conduit 812 that discharges the oxidizing gas from the stack of fuel cells 20 to the outside, a first pressure sensor 816 disposed in the upstream of the gaseous fuel discharge conduit 712 for measuring the pressure of the gaseous fuel, and a second pressure sensor 818 disposed in the upstream of the oxidizing gas discharge conduit 812 for measuring the pressure of the oxidizing gas, in addition to all the constituents of the fuel-cells generator system 710 of the seventh embodiment. The same constituents are shown by like numerals and not specifically described here.

The back-pressure regulating valve 814 is electrically connected to an input/output port 98G of an electronic control unit 90G. The position of the back-pressure regulating valve 814 is regulated by control signals output from the electronic control unit 90G. The first pressure sensor 816 and the second pressure sensor 818 are also electrically connected to the input/output port 98G of the electronic control unit 90G and output the observed pressures to the electronic control unit 90G.

The electronic control unit 90G of the fuel-cells generator system 810 carries out a control operation for regulating the pressure of the oxidizing gas, as well as the routines of the seventh embodiment (that is, the maximum water supply calculation routine, the CO concentration reduction routine, and the fuel gas pressure control routine). Regulation of the pressure of the oxidizing gas is based on an oxidizing gas pressure control routine shown in the flowchart of FIG. 28. This routine is repeatedly carried out at predetermined time intervals, for example, at every 100 msec, independently of the other routines, after a reformer 30G has been driven and reached a stationary state.

Figure 28:
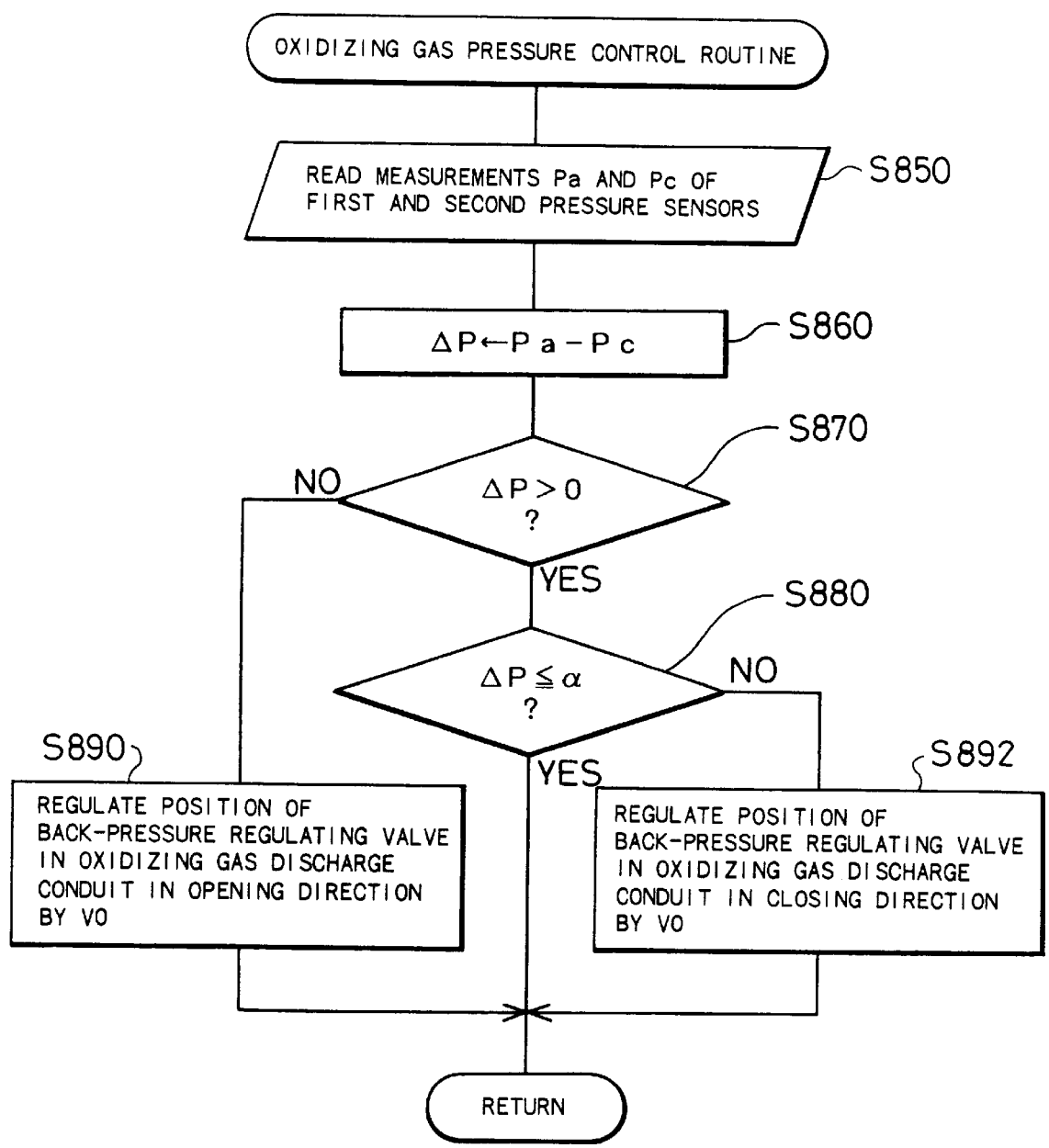
FIG. 28 is a flowchart showing an oxidizing gas pressure control routine executed by the electronic control unit 90G in the eighth embodiment.

When the program enters the routine of FIG. 28, a CPU 92G of the electronic control unit 90G first reads a pressure Pa of the gaseous fuel and a pressure Pc of the oxidizing gas respectively measured by the first and the second pressure sensors 816 and 818 at step S850.

A pressure difference $\Delta P$ is then calculated by subtracting the pressure Pc of the oxidizing gas from the pressure Pa of the gaseous fuel at step S860. The program subsequently determines whether or not the pressure difference $\Delta P$ is greater than zero at step S870 and determines whether or not the pressure difference $\Delta P$ is not greater than a predetermined value $\alpha$ (>0) at step S880. The predetermined value $\alpha$ strongly depends upon the properties of the electrolyte membrane, especially the thickness thereof, and is, for example, equal to 0.2 [kPa]. In case of the negative answer at step S870, that is, when the pressure difference $\Delta P$ is determined to be not greater than zero, the program proceeds to step S890 to regulate the position of the back-pressure regulating valve 814 in the oxidizing gas discharge conduit 812 in the opening direction by a predetermined amount V0, so as to decrease the pressure Pc of the oxidizing gas. This causes the pressure difference $\Delta P$ to become greater than zero.

In case of the negative answer at step S880, that is, when the pressure difference $\Delta P$ is greater than the predetermined value $\alpha$, the program proceeds to step S892 to regulate the position of the back-pressure regulating valve 814 in the oxidizing gas discharge conduit 812 in the closing direction by the predetermined amount V0, so as to increase the pressure Pc of the oxidizing gas. This causes the pressure difference $\Delta P$ to become equal to or less than the predetermined value $\alpha$.

After the execution of either one of steps S890 and S892 or in case of the affirmative answers at both steps S870 and S880, that is, when the relationship of $0 < \Delta P \leq \alpha$ is satisfied, the program goes to RETURN and exits from this routine.

As discussed above, the oxidizing gas pressure control routine regulates the position of the back-pressure regulating valve 814 in the oxidizing gas discharge conduit 812, thereby enabling the pressure difference $\Delta P$ obtained by subtracting the pressure Pc of the oxidizing gas from the pressure Pa of the gaseous fuel to be kept within the range of zero to the predetermined value $\alpha$. Even when the position of the back-pressure regulating valve 714 in the gaseous fuel discharge conduit 712 is regulated in the closing direction to increase the pressure of the gaseous fuel in the fuel gas pressure control routine discussed in the seventh embodiment, the structure of the eighth embodiment prevents the pressure difference $\Delta P$ between the pressure Pa of the gaseous fuel and the pressure Pc of the oxidizing gas from exceeding a predetermined range.

The fuel-cells generator system 810 of the eighth embodiment exerts the same effects as those of the seventh embodiment and further enables the pressure difference $\Delta P$ between the pressure Pa of the gaseous fuel and the pressure Pc of the oxidizing gas to be kept within a predetermined range. This effectively prevents the electrolyte membranes 21 in the stack of fuel cells 20 from being damaged by the pressure difference $\Delta P$.

Figure 29:
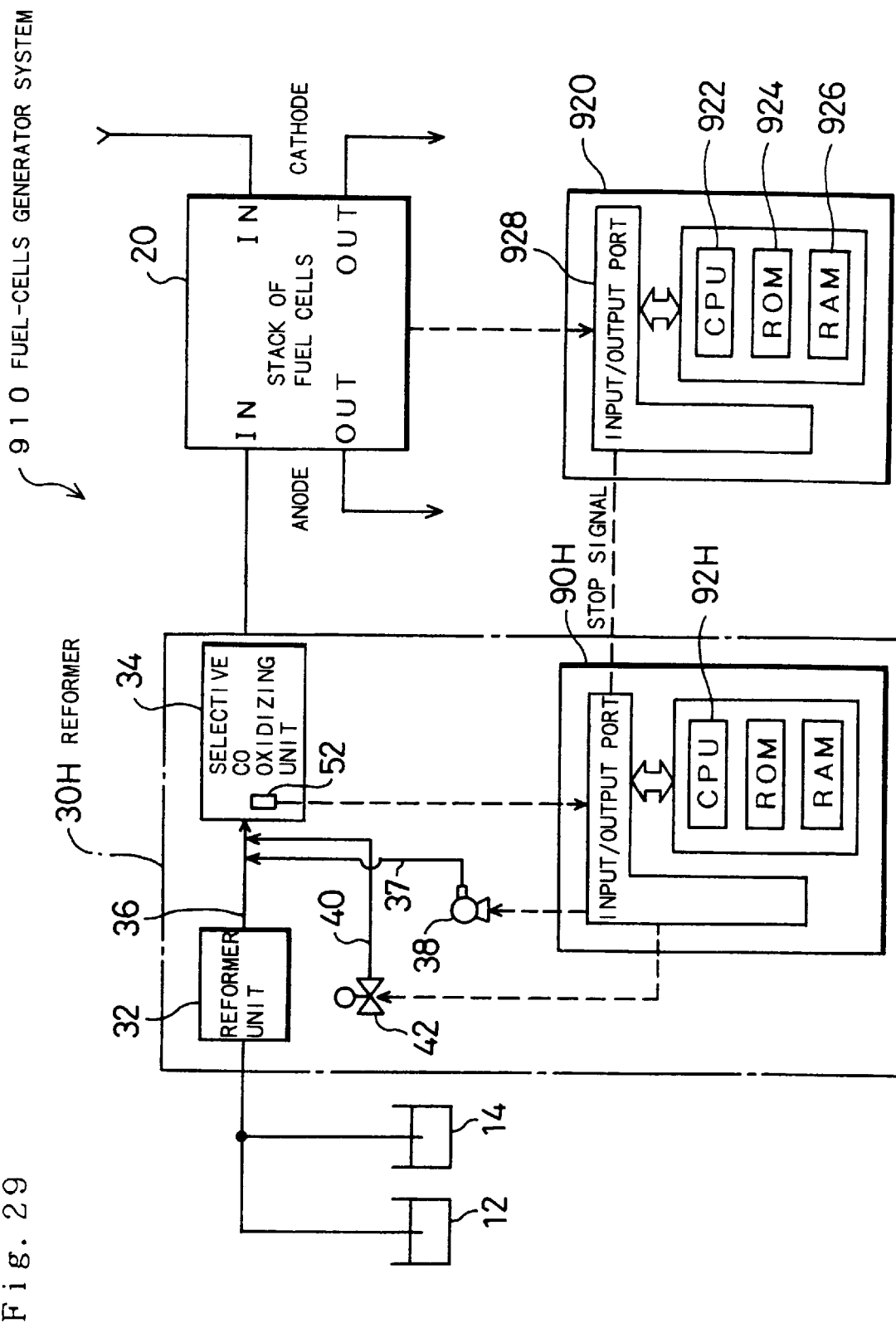
FIG. 29 is a block diagram schematically illustrating structure of another fuel-cells generator system 910 as a ninth embodiment according to the present invention.

The following describes still another fuel-cells generator system 910 as a ninth embodiment according to the present invention. FIG. 29 is a block diagram schematically illustrating structure of the fuel-cells generator system 910 of the ninth embodiment. The fuel-cells generator system 910 of the ninth embodiment has a fuel cells-operation electronic control unit 920 for controlling operation of the stack of fuel cells 20, in addition to all the constituents of the fuel-cells generator system 10 of the first embodiment. The same constituents are shown by like numerals and not specifically described here.

Like an electronic control unit 90H of a reformer 30H, the fuel-cells operation electronic control unit 920 includes a CPU 922, a ROM 924, a RAM 926, and an input/output port 928 for controlling operation of the stack of fuel cells 20. The electronic control unit 90H is electrically connected to the fuel-cells operation electronic control unit 920 and thus receives information on the operating state of the stack of fuel cells 20.

The electronic control unit 90H of the reformer 30H carries out a control operation at the time of stopping fuel cells, as well as the CO concentration reduction routine of the first embodiment shown in the flowchart of FIG. 5. The control operation at the time of stopping fuel cells is based on a stop-time control routine shown in the flowchart of FIG. 30. This routine is repeatedly carried out at predetermined time intervals, for example, at every 100 msec, independently of the CO concentration reduction routine, after the reformer 30H has been driven and reached a stationary state.

Figure 30:
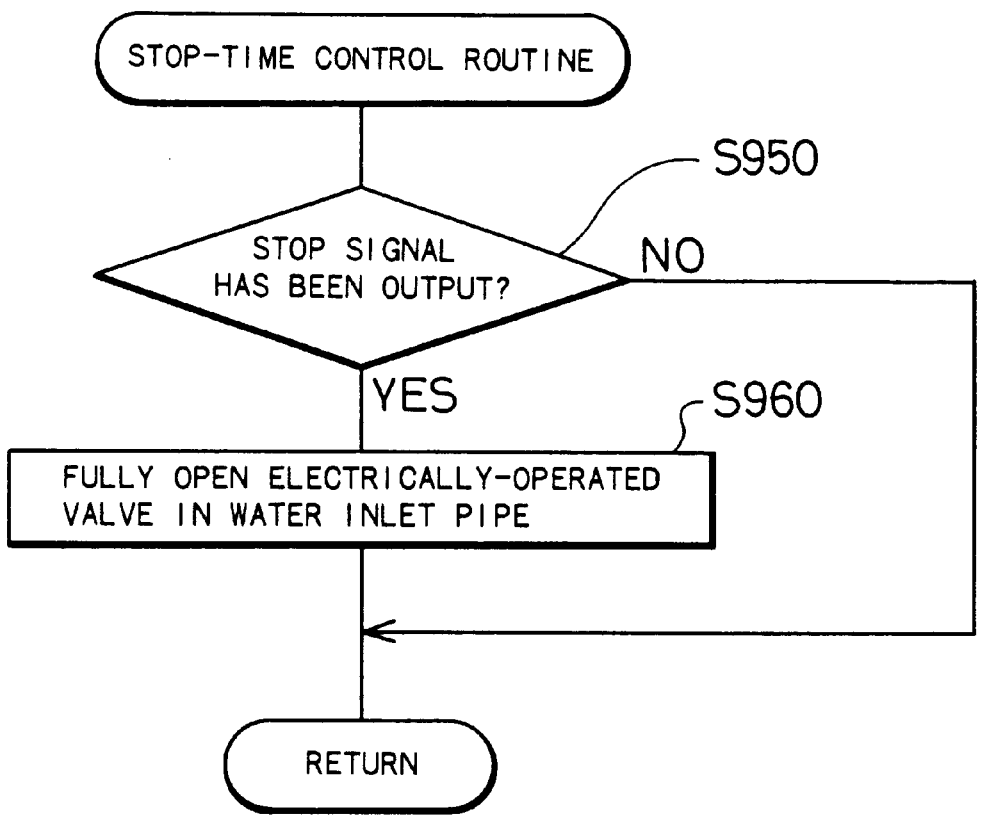
FIG. 30 is a flowchart showing a stop-time control routine executed by the electronic control unit 90H in the ninth embodiment.

When the program enters the routine of FIG. 30, a CPU 92H of the electronic control unit 90H first determines whether or not a stop signal has been output from the fuel-cells operation electronic control unit 920 at step S950. The fuel-cells operation electronic control unit 920 outputs a stop signal when the stack of fuel cells 20 has been changed from the operating state to the ceased state. When it is determined at step S950 that the stop signal has been output, the program proceeds to step S960 to drive the electrically-operated valve 42 in the water inlet pipe 40 to the full-open position. This operation enables a large amount of water to be fed from the water inlet pipe 40 to the selective CO oxidizing unit 34, thereby abruptly decreasing the internal temperature of the selective CO oxidizing unit 34 by the heat of vaporization of water.

The structure of the ninth embodiment thus quickly decreases the temperature of the selective CO oxidizing unit 34 at the time of stopping the stack of fuel cells 20. This results in rapidly stopping output of the gaseous fuel.

The stop signal may be output only in the case of a normal stop of the stack of fuel cells 20, only in the case of an emergency stop of the stack of fuel cells 20, or in both the cases.

Although the stop signal is output at the time of stopping the stack of fuel cells 20 in the ninth embodiment, the stop signal may be output at the time of stopping the whole fuel-cells generator system including the stack of fuel cells 20. This structure is also applicable to a control operation of regulating the electrically-operated valve 42 in the water inlet pipe 40 to the full-open position, prior to a stop of the reformer 30.

Figure 31:
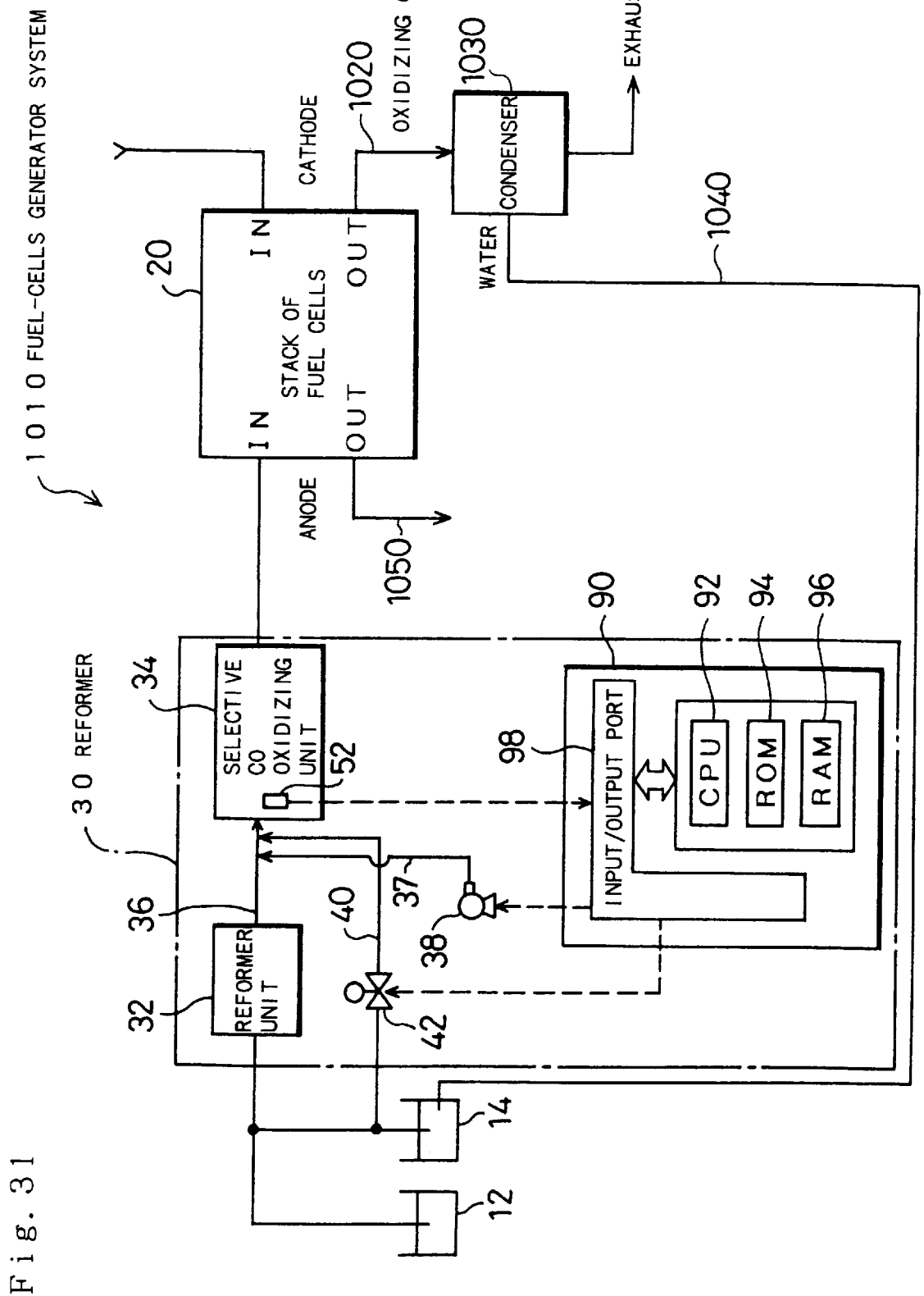
FIG. 31 is a block diagram schematically illustrating structure of still another fuel-cells generator system 1010 as a tenth embodiment according to the present invention.

The following describes still another fuel-cells generator system 1010 as a tenth embodiment according to the present invention. FIG. 31 is a block diagram schematically illustrating structure of the fuel-cells generator system 1010 of the tenth embodiment. The fuel-cells generator system 1010 of the tenth embodiment has a condenser 1030 disposed in an oxidizing gas discharge conduit 1020 that discharges the oxidizing gas from the stack of fuel cells 20 to the outside and a water conduit 1040 that connects the condenser 1030 with the water tank 14, in addition to all the constituents of the fuel-cells generator system 10 of the first embodiment. The same constituents are shown by like numerals and not specifically described here.

The condenser 1030 condenses the water vapor to produce water. The water vapor evolved at the cathodes in the stack of fuel cells 20 during power generation is recovered as water. The output of the condenser 1030 is connected to the water tank 14, from which water is fed to the reformer unit 32 and the selective CO oxidizing unit 34, via the water conduit 1040. Water produced by the condenser 1030 is accordingly sent to the water tank 14. This structure enables water used for the pyrolysis and water fed to the selective CO oxidizing unit 34 to be successively supplied through operation of the stack of fuel cells 20. This favorably reduces the size of the water tank 14 and lessens the amount of water stored in the water tank 14. Discharge of the remaining gas evolved at the cathodes to the atmosphere causes white fumes. This structure, however, prevents such a phenomenon.

In the stack of polymer electrolyte fuel cells, the gaseous fuel is generally moistened for the purpose of moistening the electrolyte membranes. Water is also fed through the water inlet pipe 40 to the selective CO oxidizing unit 34. This causes the gas discharged from the anodes in the stack of fuel cells 20 to include a large volume of water vapor or water droplets. The condenser 1030 may accordingly be disposed in a gaseous fuel discharge conduit 1050 that discharges the gaseous fuel from the stack of fuel cells 20 to the outside, instead of the oxidizing gas discharge conduit 1020, or alternatively be disposed both in the oxidizing gas discharge conduit 1020 and the gaseous fuel discharge conduit 1050.

Figure 32:
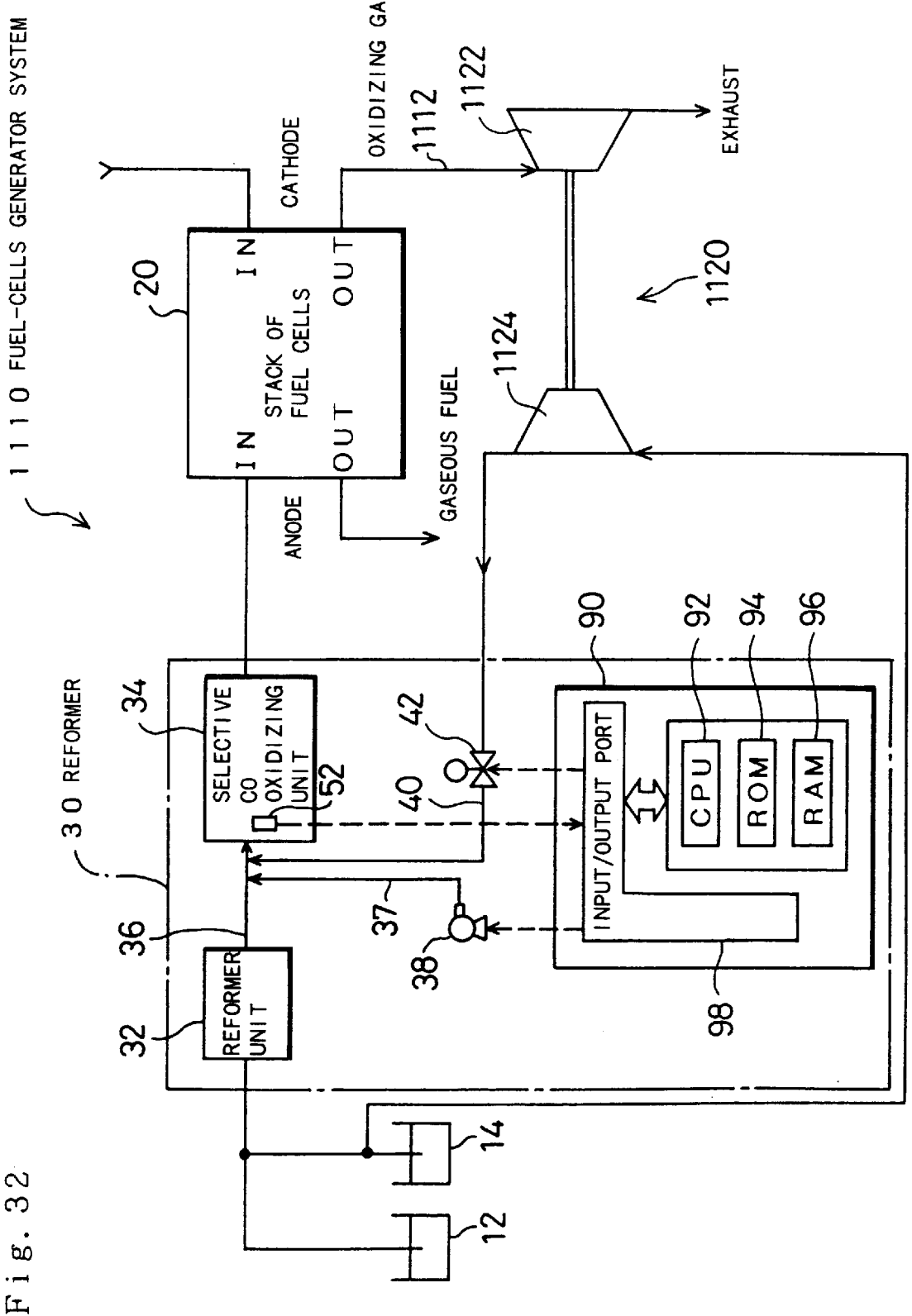
FIG. 32 is a block diagram schematically illustrating structure of another fuel-cells generator system 1110 as an eleventh embodiment according to the present invention.

The following describes still another fuel-cells generator system 1110 as an eleventh embodiment according to the present invention. FIG. 32 is a block diagram schematically illustrating structure of the fuel-cells generator system 1110 of the eleventh embodiment. The fuel-cells generator system 1110 of the eleventh embodiment has a water pressurizing mechanism 1120 in the middle of the water inlet pipe 40, in addition to all the constituents of the fuel-cells generator system 10 of the first embodiment. The same constituents are shown by like numerals and not specifically described here.

The water pressurizing mechanism 1120 includes a turbine compressor 1122 disposed in the middle of an oxidizing gas discharge conduit 1112 that discharges the oxidizing gas from the stack of fuel cells 20 to the outside, and a turbine 1124 disposed in the middle of the water inlet pipe 40 and linked coaxially with the turbine compressor 1122. The water pressurizing mechanism 1120 utilizes the energy of the flow of gaseous exhaust from the stack of fuel cells 20 to pressurize water flowing in the water inlet pipe 40. Although not being specifically mentioned in the above embodiments, pressurizing means, such as a pump, should be used to pressurize water, in order to supply water from the water inlet pipe 40 to the selective CO oxidizing unit 34. When electrical energy generated by the stack of fuel cells 20 is used as the power source of the pressurizing means, the energy efficiency of the whole fuel-cells generator system is undesirably lowered. The structure of the eleventh embodiment, however, utilizes the flow of gaseous exhaust to pressurize water. This enables water to be fed to the selective CO oxidizing unit 34 without lowering the energy efficiency of the whole fuel-cells generator system.

In this embodiment, the turbine compressor 1122 is driven by the oxidizing gas discharged from the anodes in the stack of fuel cells 20. One modified structure may, however, drive the turbine compressor 1122 by the gaseous fuel discharged from the cathodes in the stack of fuel cells 20.

Although all the above embodiments are applied to the polymer electrolyte fuel cells (PEFC), the principle of the present invention is also applicable to other fuel-cells generator systems including phosphate fuel cells (PAFC), direct methanol fuel cells (DMFC), alkali fuel cells (AFC), molten carbonate fuel cells (MCFC), and solid oxide fuel cells (SOFC).

In all the embodiments discussed above, the methanol reformer is used as the supply source of the hydrogen-rich gas. The principle of the present invention may, however, be applicable to other fuel-cells generator systems in combination with other reformers that produce a reformed gas containing hydrogen as a primary component. Available reformers use alcohols, such as methanol and ethanol, hydrocarbons, such as methane, propane, and butane, and liquid fuels, such as gasoline and light oil, as reforming materials.

In all the embodiments discussed above, the oxygen-containing oxidizing gas is the air. The principle of the present invention may also be applicable to pure oxygen.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. An apparatus for reducing concentration of carbon monoxide included in a hydrogen-rich gas, which contains both hydrogen and carbon monoxide, said apparatus comprising:

oxidizing gas introducing means for introducing an oxygen-containing oxidizing gas to said hydrogen-rich gas;

an oxidizing unit having a catalyst that enables oxygen included in said oxidizing gas to be bonded to said carbon monoxide included in said hydrogen-rich gas preferentially over hydrogen included in said hydrogen-rich gas; and water supply means for applying a supply of water onto the catalyst itself.

2. An apparatus in accordance with claim 1, wherein said water supply means comprises a plurality of water supply conduits that enable water to be fed to said oxidizing unit via different pathways.

3. An apparatus in accordance with claim 2, wherein said catalyst in said oxidizing unit is divided into a plurality of groups of catalyst having a predetermined shape, said plurality of groups of catalyst being arranged along a flow direction of said hydrogen-rich gas, said plurality of water supply conduits being arranged to enable water to be fed to said plurality of groups of catalyst.

4. An apparatus in accordance with claim 1, said apparatus further comprising:

temperature detection means for measuring a temperature of said oxidizing unit; and control means for regulating an amount of water supply by said water supply means, thereby enabling said temperature of said oxidizing unit to be kept within a predetermined range.

5. An apparatus in accordance with claim 1, said apparatus further comprising:

carbon monoxide concentration detection means for measuring a concentration of carbon monoxide included in said hydrogen-rich gas;

oxidizing gas supply control means for regulating an amount of oxidizing gas supply by said oxidizing gas introducing means according to said concentration of carbon monoxide; and water supply control means for regulating an amount of water supply by said water supply means according to said amount of oxidizing gas supply.

6. An apparatus in accordance with claim 5, wherein said water supply control means comprises:

water supply calculation means for specifying said amount of water supply by said water supply means in order to hold a predetermined ratio to said amount of oxidizing gas supply.

7. An apparatus in accordance with claim 1, said apparatus further comprising:

oxidative reaction detection means for detecting a progress of an oxidative reaction in said oxidizing unit; and control means for regulating an amount of water supply by said water supply means according to said progress of said oxidative reaction.

8. An apparatus in accordance with claim 7, wherein said oxidative reaction detection means comprises means for measuring a temperature of said oxidizing unit, wherein the oxidative reaction detection means detects said progress of said oxidative reaction based on said temperature of said oxidizing unit.

9. An apparatus in accordance with claim 7, wherein said oxidative reaction detection means comprises means for measuring a flow rate of said hydrogen-rich gas, wherein said oxidative reaction detection means detects said progress of said oxidative reaction based on said flow rate of said hydrogen-rich gas.

10. An apparatus in accordance with claim 7, wherein said oxidative reaction detection means comprises means for measuring a concentration of carbon monoxide included in said hydrogen-rich gas, wherein said oxidative reaction detection means detects said progress of said oxidative reaction based on said concentration of carbon monoxide.

* * * * *